US012663675B2

(12) United States Patent

Ikeda et al.

(10) Patent No.: US 12,663,675 B2
(45) Date of Patent: **\*Jun. 23, 2026**

(54) LIQUID CRYSTAL LIGHT CONTROL DEVICE

(71) Applicant: Japan Display Inc., Tokyo (JP)

(72) Inventors: Kojiro Ikeda, Tokyo (JP); Takeo Koito, Tokyo (JP); Tae Kurokawa, Tokyo (JP)

(73) Assignee: Japan Display Inc., Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 18/913,609

(22) Filed: Oct. 11, 2024

(65) Prior Publication Data

US 2025/0035988 A1 Jan. 30, 2025

Related U.S. Application Data

(63) Continuation of application No. 18/369,005, filed on Sep. 15, 2023, now Pat. No. 12,140,837, which is a (Continued)

(30) Foreign Application Priority Data

Mar. 24, 2021 (JP) ................................ 2021-050757

(51) Int. Cl.
*G02F 1/1337* (2006.01)
*G02F 1/1343* (2006.01)

(52) U.S. Cl.
CPC .. *G02F 1/133753* (2013.01); *G02F 1/134309* (2013.01)

(58) Field of Classification Search
CPC ............. G02F 1/1337; G02F 1/134309; G02F 1/1347; G02F 1/29; G02F 1/292; G02F 2201/124
See application file for complete search history.

(56) References Cited

U.S. PATENT DOCUMENTS 12,140,837 B2 \* 11/2024 Ikeda ................ G02F 1/134309

FOREIGN PATENT DOCUMENTS

EP 1647857 A1 4/2006

OTHER PUBLICATIONS

Office Action dated Nov. 15, 2024 issued in related Canadian Patent Application No. 3,211,918. 4 pages.

(Continued)

*Primary Examiner* — David Y Chung
(74) *Attorney, Agent, or Firm* — K&L Gates LLP

(57) ABSTRACT

A liquid crystal light control device includes a first liquid crystal cell, a second liquid crystal cell overlapping the first liquid crystal cell, a third liquid crystal cell overlapping the second liquid crystal cell, and a fourth liquid crystal cell overlapping the third liquid crystal cell. Each of the first, second, third, and fourth liquid crystal cells includes, a first substrate including a first alignment film, a second substrate including an electrode having a strip pattern and a second alignment film, and a liquid crystal layer between the first substrate and the second substrate. An alignment direction of the first alignment film and an alignment direction of the second alignment film are aligned to intersect each other. A longitudinal direction of the strip pattern of the electrode having the strip pattern is arranged to intersect an alignment direction of the second alignment film.

10 Claims, 25 Drawing Sheets

Related U.S. Application Data continuation of application No. PCT/JP2022/010103, filed on Mar. 8, 2022.

(56) References Cited

OTHER PUBLICATIONS

English translation of Office Action issued in related Chinese Patent Application No. 202280021641.8 dated Sep. 19, 2025. 8 pages.
English translation of Office Action dated Oct. 14, 2025 issued in BR Appl. No. 112023019009-6. 4 pages.
English translation of Office Action dated Mar. 4, 2026 issued in CN Appl. No. 202280021641.8. 5 pages.
English translation of Office Action dated Mar. 10, 2026 issued in JP Appl. No. 2025-107314. 4 pages.
Office Action dated Apr. 27, 2026 issued in IN Appl. No. 202317062969. 10 pages.

* cited by examiner

FIG. 10

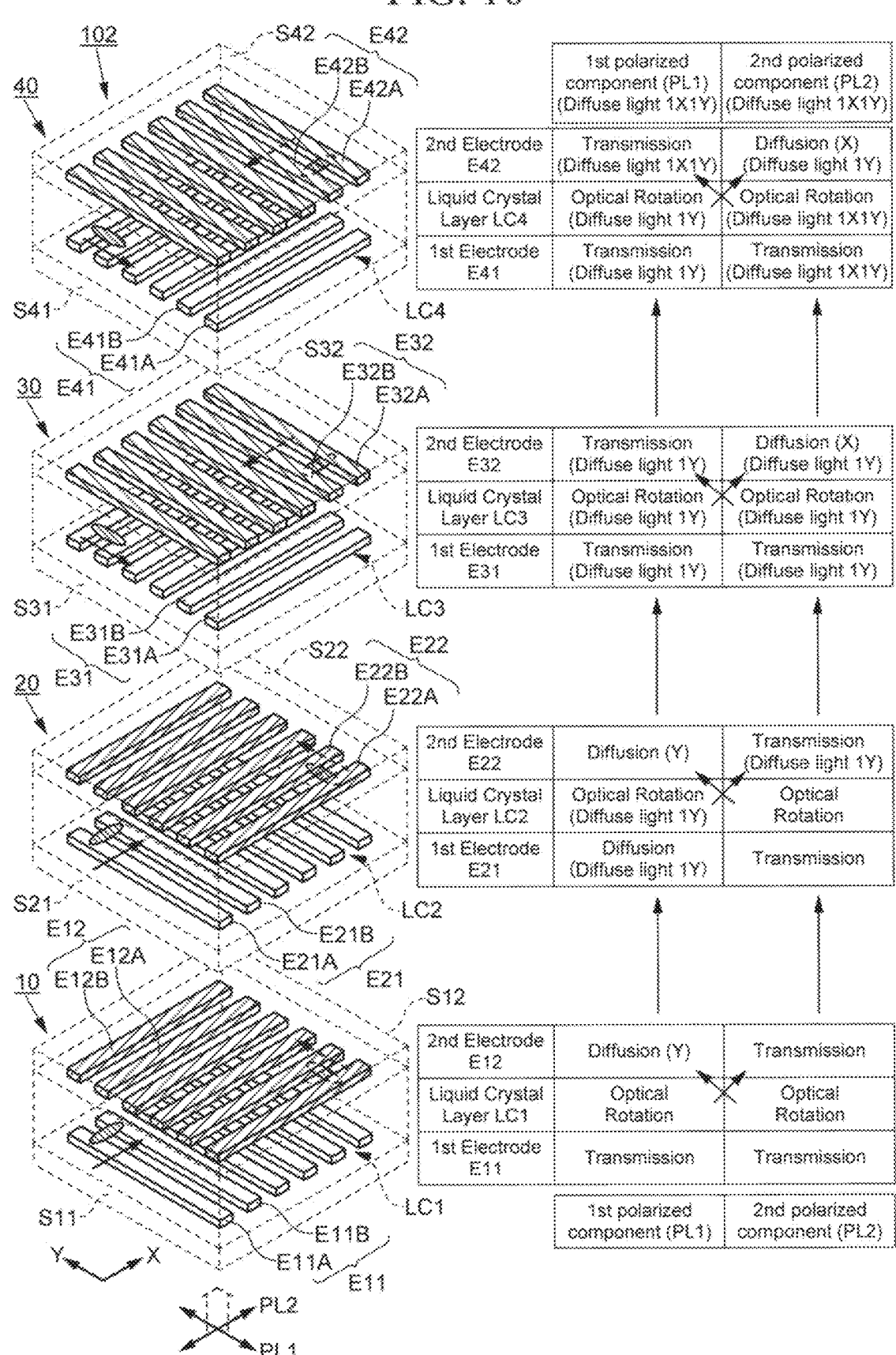

| | 1st polarized component (PL1) (Diffuse light 1X1Y) | 2nd polarized component (PL2) (Diffuse light 1X1Y) |
|---|---|---|
| 2nd Electrode E42 | Transmission (Diffuse light 1X1Y) | Diffusion (X) (Diffuse light 1Y) |
| Liquid Crystal Layer LC4 | Optical Rotation (Diffuse light 1Y) | Optical Rotation (Diffuse light 1X1Y) |
| 1st Electrode E41 | Transmission (Diffuse light 1Y) | Transmission (Diffuse light 1X1Y) |

| | | |
|---|---|---|
| 2nd Electrode E32 | Transmission (Diffuse light 1Y) | Diffusion (X) (Diffuse light 1Y) |
| Liquid Crystal Layer LC3 | Optical Rotation (Diffuse light 1Y) | Optical Rotation (Diffuse light 1Y) |
| 1st Electrode E31 | Transmission (Diffuse light 1Y) | Transmission (Diffuse light 1Y) |

| | | |
|---|---|---|
| 2nd Electrode E22 | Diffusion (Y) | Transmission (Diffuse light 1Y) |
| Liquid Crystal Layer LC2 | Optical Rotation (Diffuse light 1Y) | Optical Rotation |
| 1st Electrode E21 | Diffusion (Diffuse light 1Y) | Transmission |

| | | |
|---|---|---|
| 2nd Electrode E12 | Diffusion (Y) | Transmission |
| Liquid Crystal Layer LC1 | Optical Rotation | Optical Rotation |
| 1st Electrode E11 | Transmission | Transmission |

| | 1st polarized component (PL1) | 2nd polarized component (PL2) |
|---|---|---|

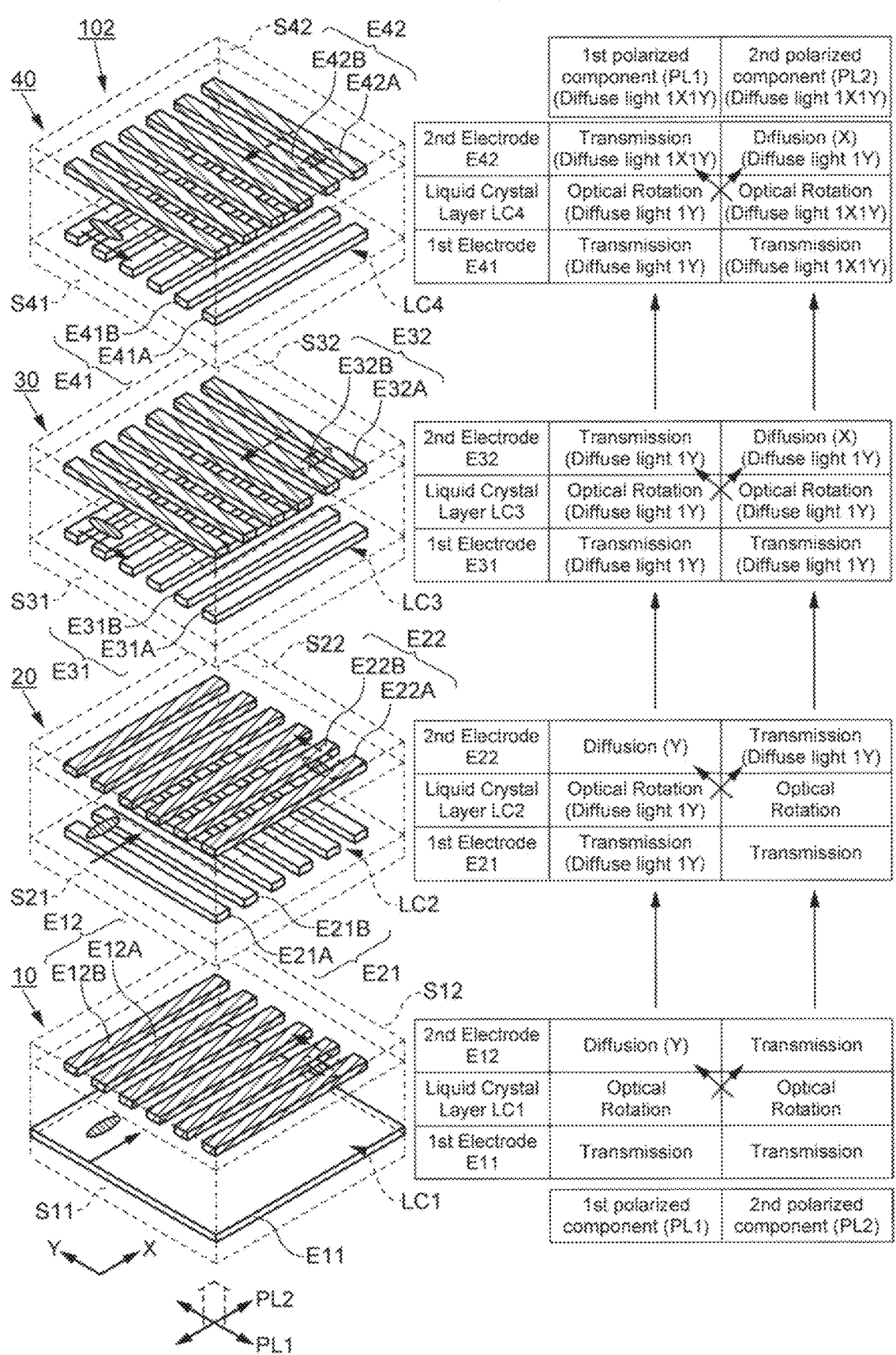

| | 1st polarized component (PL1) (Diffuse light 1X1Y) | 2nd polarized component (PL2) (Diffuse light 1X1Y) |
|---|---|---|
| 2nd Electrode E42 | Transmission (Diffuse light 1X1Y) | Diffusion (X) (Diffuse light 1Y) |
| Liquid Crystal Layer LC4 | Optical Rotation (Diffuse light 1Y) | Optical Rotation (Diffuse light 1X1Y) |
| 1st Electrode E41 | Transmission (Diffuse light 1Y) | Transmission (Diffuse light 1X1Y) |

| | | |
|---|---|---|
| 2nd Electrode E32 | Transmission (Diffuse light 1Y) | Diffusion (X) (Diffuse light 1Y) |
| Liquid Crystal Layer LC3 | Optical Rotation (Diffuse light 1Y) | Optical Rotation (Diffuse light 1Y) |
| 1st Electrode E31 | Transmission (Diffuse light 1Y) | Transmission (Diffuse light 1Y) |

| | | |
|---|---|---|
| 2nd Electrode E22 | Diffusion (Y) | Transmission (Diffuse light 1Y) |
| Liquid Crystal Layer LC2 | Optical Rotation (Diffuse light 1Y) | Optical Rotation |
| 1st Electrode E21 | Transmission (Diffuse light 1Y) | Transmission |

| | | |
|---|---|---|
| 2nd Electrode E12 | Diffusion (Y) | Transmission |
| Liquid Crystal Layer LC1 | Optical Rotation | Optical Rotation |
| 1st Electrode E11 | Transmission | Transmission |

| | 1st polarized component (PL1) | 2nd polarized component (PL2) |
|---|---|---|

LIQUID CRYSTAL LIGHT CONTROL DEVICE

CROSS-REFERENCE TO RELATED APPLICATIONS

This application is a continuation of U.S. patent application Ser. No. 18/369,005, filed on Sep. 15, 2023, which is a continuation of International Patent Application No. PCT/JP2022/010103, filed on Mar. 8, 2022, which claims the benefit of priority to Japanese Patent Application No. 2021-050757, filed on Mar. 24, 2021, the entire contents of which are incorporated herein by reference.

FIELD

An embodiment of the present invention relates to a device that controls the light distribution of light emitted from a light source using the electrooptical effect of liquid crystals.

BACKGROUND

There is known technology to control the light distribution of light emitted from a light source by using a liquid crystal element. For example, a lighting device that controls the spread of light emitted from a light source by using a liquid crystal cell with concentric circular electrodes is disclosed (for example, refer to Japanese Unexamined Patent Application Publication No. 2010-230887 and Japanese Unexamined Patent Application Publication No. 2005-317879).

SUMMARY

A liquid crystal light control device in an embodiment according to the present invention includes a first liquid crystal cell, a second liquid crystal cell overlapping the first liquid crystal cell, a third liquid crystal cell overlapping the second liquid crystal cell, and a fourth liquid crystal cell overlapping the third liquid crystal cell. Each of the first liquid crystal cell, the second liquid crystal cell, the third liquid crystal cell, and the fourth liquid crystal cell includes a first substrate including a first alignment film, a second substrate including an electrode having a strip pattern and a second alignment film, a liquid crystal layer between the first substrate and the second substrate, and an alignment direction of the first alignment film and an alignment direction of the second alignment film are aligned to intersect each other. A longitudinal direction of the strip pattern of the electrode having the strip pattern is arranged to intersect an alignment direction of the second alignment film, and a transverse electric field is generated in the same direction as the alignment direction of the second alignment film.

A liquid crystal light control device in an embodiment according to the present invention includes a first liquid crystal cell, a second liquid crystal cell overlapping the first liquid crystal cell, a third liquid crystal cell overlapping the second liquid crystal cell, and a fourth liquid crystal cell overlapping the third liquid crystal cell. Each of the first liquid crystal cell, the second liquid crystal cell, the third liquid crystal cell, and the fourth liquid crystal cell includes a first substrate including a first electrode having a strip pattern and a first alignment film, a second substrate including a second electrode having a strip pattern and a second alignment film, a liquid crystal layer between the first substrate and the second substrate, an alignment direction of the first alignment film and an alignment direction of the second alignment film are arranged to intersect each other, a longitudinal direction of the strip pattern of the first electrode and a longitudinal direction of the strip pattern of the second electrode are arranged to intersect each other, and the longitudinal direction of the strip pattern of the second electrode is arranged to intersect the alignment direction of the second alignment film. The second electrodes of the first liquid crystal cell and the third liquid crystal cell generate a transverse electric field in the same direction as the alignment direction of the second alignment film, and the first electrodes of the second liquid crystal cell and the fourth liquid crystal cell generate a transverse electric field in the same direction as the alignment direction of the first alignment film.

BRIEF DESCRIPTION OF DRAWINGS

FIG. 10 is a diagram illustrating an operation of a liquid crystal light control device according to an embodiment of the present invention.

FIG. 14 is a diagram illustrating an operation of a liquid crystal light control device according to an embodiment of the present invention.

FIG. 15 is a diagram illustrating an operation of a liquid crystal light control device according to an embodiment of the present invention.

FIG. 16 is a diagram illustrating an operation of a liquid crystal light control device according to an embodiment of the present invention.

DESCRIPTION OF EMBODIMENTS

Hereinafter, embodiments of the present invention are described with reference to the drawings. However, the present invention can be implemented in many different aspects, and should not be construed as being limited to the description of the following embodiments. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to previous drawings may be given the same reference sign (or a number followed by a, b, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

The term "optical rotation" as used herein refers to a phenomenon in which a linearly polarized component rotates its polarization axis as it passes through the liquid crystal layer.

The term "alignment direction" of an alignment film herein refers to the direction in which the liquid crystal molecules are aligned on the alignment film by a treatment (for example, rubbing treatment) that imparts an orientation-restricting force on the alignment film. When the treatment performed on the alignment film is a rubbing treatment, the alignment direction of the alignment film is usually the rubbing direction.

The "longitudinal direction" of a strip pattern herein refers to the direction in which the long side of a pattern having a short side (width) and a long side (length) extends when the strip pattern is viewed in a plan view. The strip pattern shall include a rectangular pattern in a plan view, and shall also include a pattern that bends or curves at least once in the middle of its long side.

Figure 1:
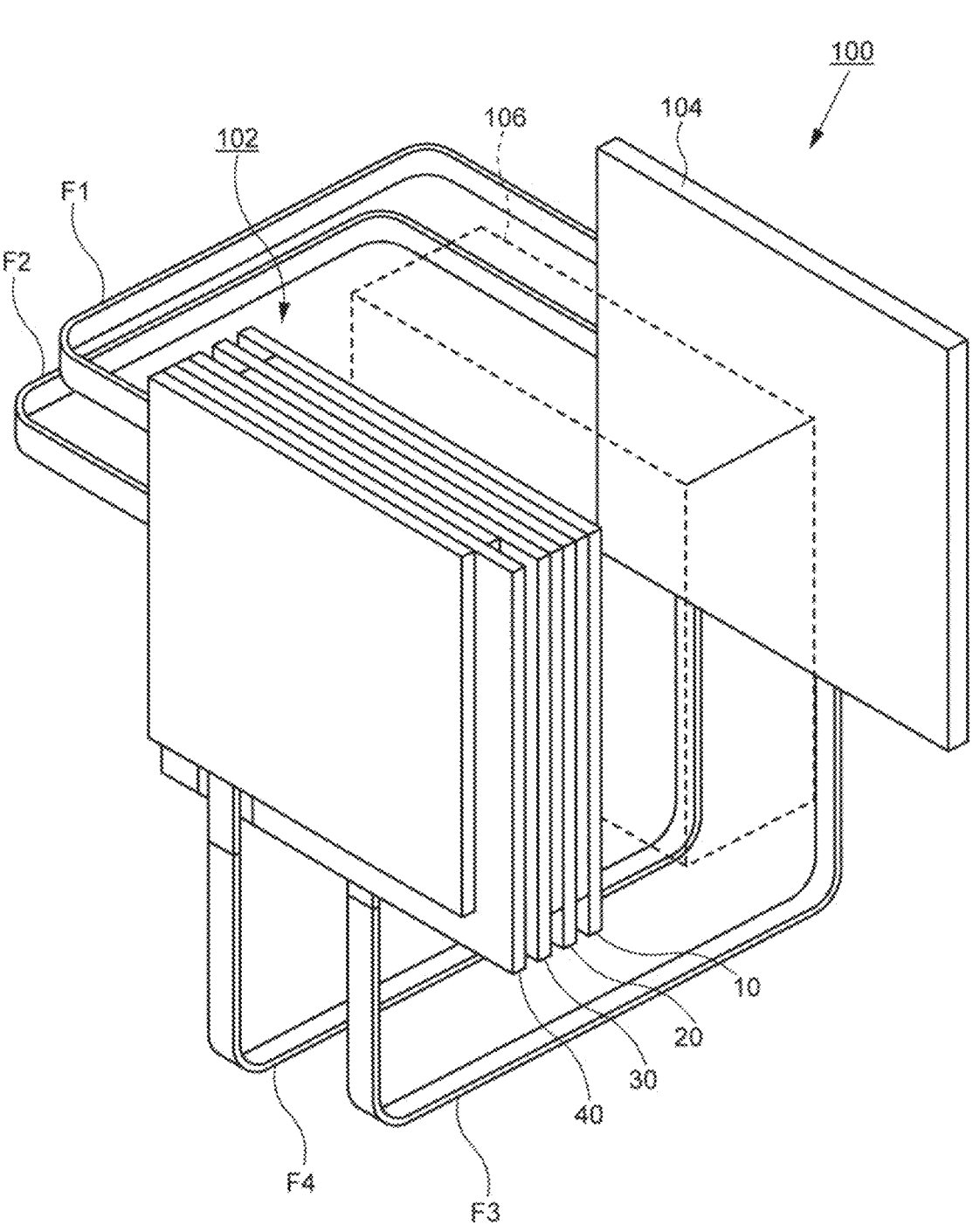
FIG. 1 is a schematic diagram of a configuration of a liquid crystal light control device according to an embodiment of the present invention.

FIG. 1 shows a diagram of a liquid crystal light control device 100 according to an embodiment of the present invention. The liquid crystal light control device 100 includes a liquid crystal light control element 102 and a circuit board 104. The liquid crystal light control element 102 includes a plurality of liquid crystal cells. In the present embodiment, the liquid crystal light control element 102 includes at least four liquid crystal cells.

FIG. 1 shows a configuration in which the liquid crystal light control element 102 is configured with a first liquid crystal cell 10, a second liquid crystal cell 20, a third liquid crystal cell 30, and a fourth liquid crystal cell 40. The first liquid crystal cell 10, the second liquid crystal cell 20, the third liquid crystal cell 30, and the fourth liquid crystal cell 40 are flat panels, and the flat surfaces of the respective liquid crystal cells are arranged overlapping each other. Transparent adhesive layers, not shown, are arranged between the first liquid crystal cell 10 and the second liquid crystal cell 20, between the second liquid crystal cell 20 and the third liquid crystal cell 30, and between the third liquid crystal cell 30 and the fourth liquid crystal cell 40. The liquid crystal light control element 102 has a structure in which the liquid crystal cells arranged adjacent to each other in the front and rear are bonded to each other by the transparent adhesive layer.

The circuit board 104 includes a circuit that drives the liquid crystal light control element 102. The first liquid crystal cell 10 is connected to the circuit board 104 by a first flexible wiring substrate F1, the second liquid crystal cell 20 is connected to the circuit board 104 by a second flexible wiring substrate F2, the third liquid crystal cell 30 is connected to the circuit board 104 by a third flexible wiring substrate F3, and the fourth liquid crystal cell 40 is connected to the circuit board 104 by a fourth flexible wiring substrate F4. The circuit board 104 outputs control signals to each liquid crystal cell to control the alignment state of the liquid crystal via the flexible wiring substrates.

A light source unit 106 is arranged on the rear side of the liquid crystal light control element 102 in the liquid crystal light control device 100 shown in FIG. 1. The liquid crystal light control device 100 is configured so that light emitted from the light source unit 106 is emitted through the liquid crystal light control element 102 to the front side of the drawing. The liquid crystal light control element 102 has the first liquid crystal cell 10, the second liquid crystal cell 20, the third liquid crystal cell 30, and the fourth liquid crystal cell 40 arranged in this order from the side of the light source unit 106.

The light source unit 106 includes a white light source, and an optical element such as a lens may be arranged between the white light source and the liquid crystal light control element 102, as required. The white light source is a light source that radiates light close to natural light, and may be a light source that radiates dimmed light, such as daylight white or a light bulb color. The liquid crystal light control device 100 functions to control the diffusion direction of light emitted from the light source unit 106 by the liquid crystal light control element 102. The liquid crystal light control element 102 has the function of shaping the light emitted from the light source unit 106 into a light distribution pattern, such as a square shape, cross shape, line shape, or the like.

Figure 2:
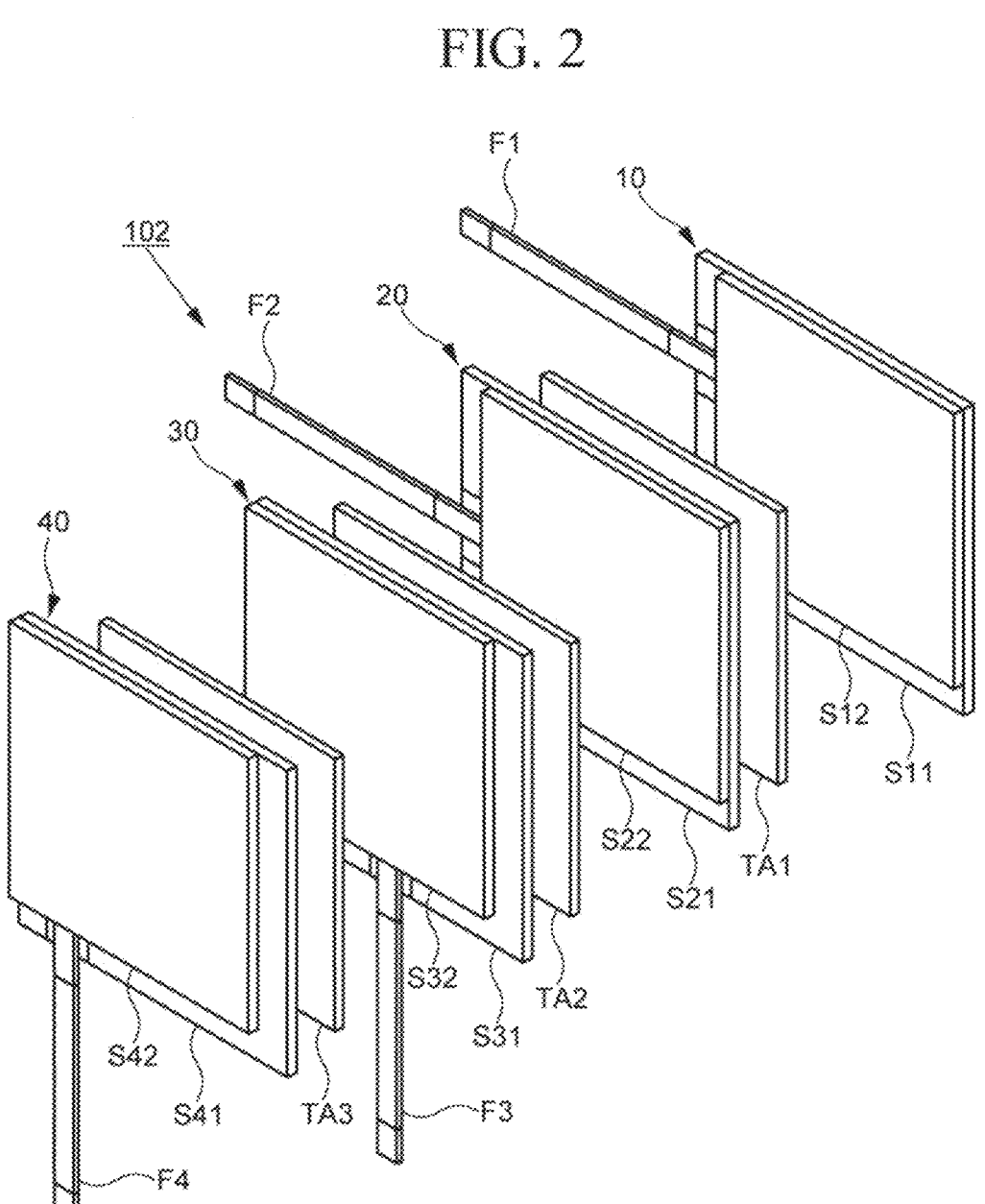
FIG. 2 is an exploded view of a liquid crystal light control element that configures a liquid crystal light control device according to an embodiment of the present invention.

FIG. 2 shows an exploded view of the liquid crystal light control element 102 shown in FIG. 1. The liquid crystal light control element 102 includes the first liquid crystal cell 10, the second liquid crystal cell 20, the third liquid crystal cell 30, and the fourth liquid crystal cell 40.

The first liquid crystal cell 10 includes a first substrate S11 and a second substrate S12. The first substrate S11 and the second substrate S12 are arranged facing each other with a gap therebetween. A liquid crystal layer, not shown, is arranged in the gap between the first substrate S11 and the second substrate S12. The first flexible wiring substrate F1 is connected to the first substrate S11.

The second liquid crystal cell 20 includes a first substrate S21, a second substrate S22, and the second flexible wiring substrate F2, and has the same configuration as the first liquid crystal cell 10. The third liquid crystal cell 30 includes a first substrate S31, a second substrate S32, and the third flexible wiring substrate F3, and has the same configuration as the first liquid crystal cell 10. The fourth liquid crystal cell 40 includes a first substrate S41, a second substrate S42, and the fourth flexible wiring substrate F4, and has the same configuration as the first liquid crystal cell 10.

A first transparent adhesive layer TA1 is arranged between the first liquid crystal cell 10 and the second liquid crystal cell 20. The first transparent adhesive layer TA1 transmits visible light and bonds the second substrate S12 of the first liquid crystal cell 10 and the first substrate S21 of the second liquid crystal cell 20. The second transparent adhesive layer TA2 is arranged between the second liquid crystal cell 20 and the third liquid crystal cell 30. The second transparent adhesive layer TA2 transmits visible light and bonds the second substrate S22 of the second liquid crystal cell 20 and the first substrate S31 of the third liquid crystal cell 30. A third transparent adhesive layer TA3 is arranged between the third liquid crystal cell 30 and the fourth liquid crystal cell 40. The third transparent adhesive layer TA3 transmits visible light and bonds the second substrate S32 of the third liquid crystal cell 30 and the first substrate S41 of the fourth liquid crystal cell 40.

The first transparent adhesive layer TA1, the second transparent adhesive layer TA2, and the third transparent adhesive layer TA3 preferably have high transmittance and a refractive index close to that of the first substrate S11, S21, S31, S41 and the second substrate S12, S22, S23, S24. An optical elasticity resin can be used as the first transparent adhesive layer TA1, the second transparent adhesive layer TA2, and the third transparent adhesive layer TA3, for example, an adhesive material including acrylic resin with translucent properties. Since the temperature of the liquid crystal light control element 102 rises due to heat radiated from the light source unit 106, the coefficient of thermal expansion of the first transparent adhesive layer TA1, the second transparent adhesive layer TA2, and the third transparent adhesive layer TA3 preferably has a value close to that of the first substrate and the second substrate.

However, since the coefficient of thermal expansion of the first transparent adhesive layer TA1, the second transparent adhesive layer TA2, and the third transparent adhesive layer TA3 is often higher than that of the glass substrate, for example, stress relaxation when the temperature rises must be considered. It is preferable that the thicknesses of the first transparent adhesive layer TA1, the second transparent adhesive layer TA2, and the third transparent adhesive layer TA3 be thicker than the cell gap (thickness of the liquid crystal layer) of each liquid crystal cell (first liquid crystal cell 10, second liquid crystal cell 20, third liquid crystal cell 30, fourth liquid crystal cell 40) in order to mitigate thermal stress when the temperature rises.

As described below, the first liquid crystal cell 10, the second liquid crystal cell 20, the third liquid crystal cell 30, and the fourth liquid crystal cell 40 have substantially the same structure. The liquid crystal light control element 102 has a structure in which the third liquid crystal cell 30 and the fourth liquid crystal cell 40 overlap with respect to the first liquid crystal cell 10 and the second liquid crystal cell 20 rotated by 90 degrees. In other words, the liquid crystal light control element 102 includes a plurality of liquid crystal cells and includes a structure in which at least one liquid crystal cell and other liquid crystal cells adjacent to (overlapping) the at least one liquid crystal cell is arranged rotated within a range of 90±10 degrees. The above rotation angle of the third liquid crystal cell 30 and the fourth liquid crystal cell 40 can be set in the range of 90±10 degrees.

FIG. 2 shows that the third liquid crystal cell 30 and the fourth liquid crystal cell 40 are arranged with respect to the arrangement of the first liquid crystal cell 10 and the second liquid crystal cell 20, which are rotated by 90 degrees. On the other hand, it can be noted that when the third liquid crystal cell 30 and the fourth liquid crystal cell 40 are taken as a reference, the first liquid crystal cell 10 and the second liquid crystal cell 20 are arranged in a position rotated by 90 degrees. It is possible to change the arrangement of the electrodes and to change the diffusion of light passing through the stacked liquid crystal cells by stacking a plurality of liquid crystal cells having the same electrode patterns and rotating some of the liquid crystal cells. The details are described below.

Figure 3:
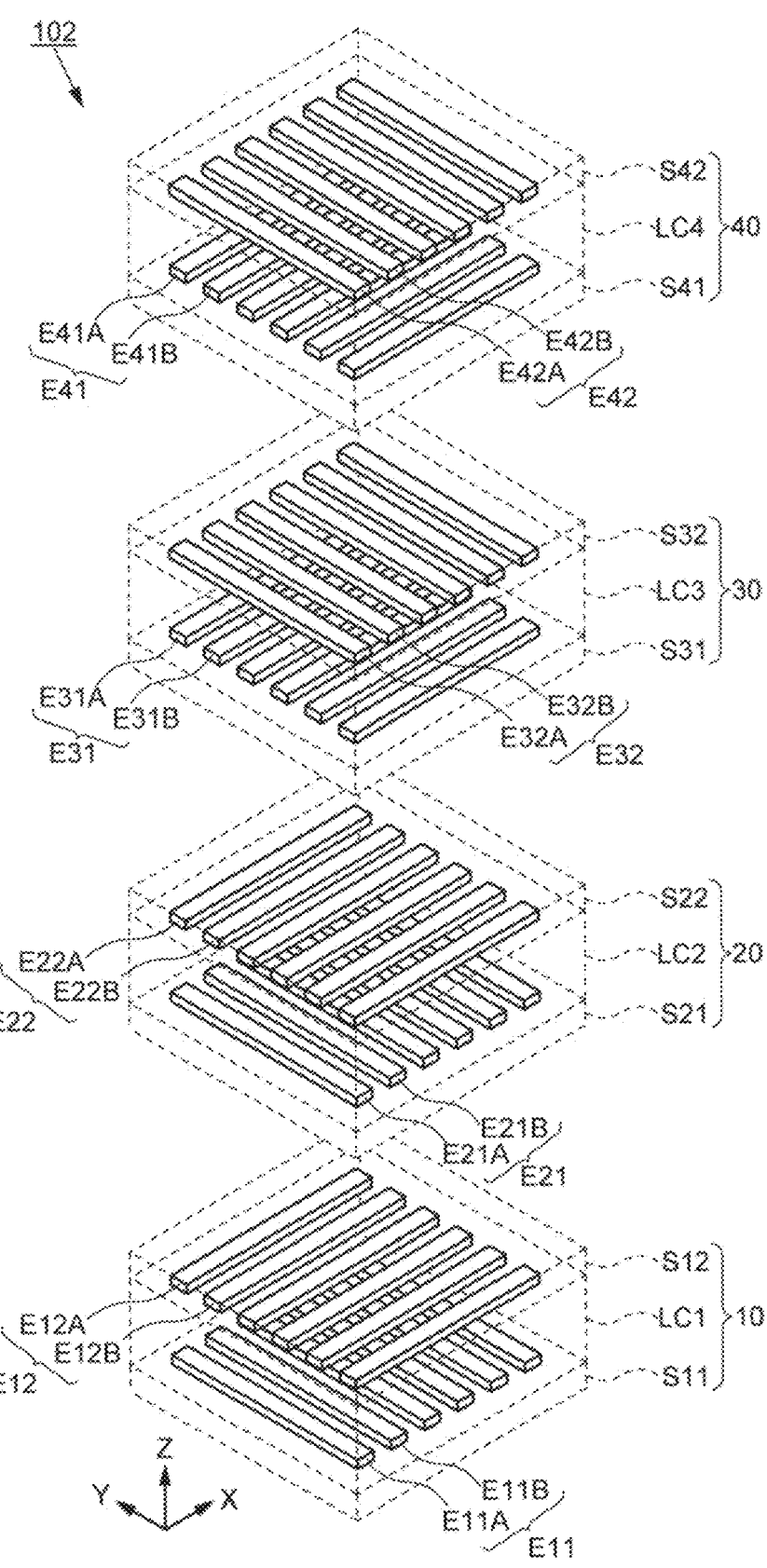
FIG. 3 is a diagram showing an arrangement of electrodes of a first liquid crystal cell, a second liquid crystal cell, a third liquid crystal cell, and a fourth liquid crystal cell that configure a liquid crystal light control element according to an embodiment of the present invention.

FIG. 3 shows a perspective view of an arrangement of electrodes in each of the first liquid crystal cell 10, the second liquid crystal cell 20, the third liquid crystal cell 30, and the fourth liquid crystal cell 40. FIG. 3 shows the X, Y, and Z axes for explanation. For the following explanation, an X-axis direction refers to the direction along the X-axis, a Y-axis direction refers to the direction along the Y-axis, and a Z-axis direction refers to the direction along the Z-axis.

The first liquid crystal cell 10, the second liquid crystal cell 20, the third liquid crystal cell 30, and the fourth liquid crystal cell 40 are arranged over each other in the Z-axis direction. Although the actual liquid crystal light control element 102 is arranged so that each liquid crystal cell is closely spaced, FIG. 3 shows each liquid crystal cell in its unfolded state for the purpose of explanation.

The first liquid crystal cell 10 includes a first substrate S11 and a second substrate S12, a first electrode E11 and a second electrode E12, and a first liquid crystal layer LC1 between the first substrate S11 and the second substrate S12. The first electrode E11 is arranged between the first substrate S11 and the first liquid crystal layer LC1, and the second electrode E12 is arranged between the second substrate S12 and the first liquid crystal layer LC1. As described above, the first substrate S11 and the second substrate S12 are facing each other, and the facing surface can be defined as the inner surface and the surface opposite the inner surface as the outer surface. In this case, the first electrode E11 is arranged on the inner surface of the first substrate and the second electrode E12 is arranged on the inner surface of the second substrate. The same applies to the second liquid crystal cell 20, the third liquid crystal cell 30, and the fourth liquid crystal cell 40 described below.

The first electrode E11 includes a plurality of first strip electrodes E11A and a plurality of second strip electrodes E11B formed in a strip shape, the second electrode E12 includes a plurality of third strip electrodes E12A and a plurality of fourth strip electrodes E12B formed in strip shape. The plurality of first strip electrodes E11A and the plurality of second strip electrodes E11B are arranged alternately, separated so that the comb teeth bite each other, and the plurality of third strip electrodes E12A and the plurality of fourth strip electrodes E12B are arranged alternately so that the comb teeth occlude each other.

A longitudinal direction of the plurality of first strip electrodes E11A and the plurality of second strip electrodes E11B is arranged in a direction parallel to the Y-axis direction, and a longitudinal direction of the plurality of third strip electrodes E12A and the plurality of fourth strip electrodes E12B is arranged in a direction parallel to the X-axis direction. In other words, the plurality of first strip electrodes E11A and the plurality of second strip electrodes E11B, and the plurality of third strip electrodes E12A and the plurality of fourth strip electrodes E12B are arranged so that their longitudinal directions intersect. This intersecting angle is preferably 90±10 degrees, and more preferably 90 degrees (orthogonal).

The second liquid crystal cell 20 includes a first substrate S21 and a second substrate S22, a first electrode E21 and a second electrode E22, and a second liquid crystal layer LC2 between the first substrate S21 and the second substrate S22. The first electrode E21 is arranged between the first substrate S21 and the second liquid crystal layer LC2, and the second electrode E22 is arranged between the second substrate S22 and the second liquid crystal layer LC2.

The first electrode E21 includes a plurality of first strip electrodes E21A and a plurality of second strip electrodes E21B formed in a strip shape, the second electrode E22 includes a plurality of third strip electrodes E22A and a plurality of fourth strip electrodes E22B formed in strip shape. The plurality of first strip electrodes E21A and the plurality of second strip electrodes E21B are arranged alternately so that the comb teeth bite each other, and the plurality of third strip electrodes E22A and the plurality of fourth strip electrodes E22B are arranged alternately so that the comb teeth occlude each other.

A longitudinal direction of the plurality of first strip electrodes E21A and the plurality of second strip electrodes E21B is arranged in a direction parallel to the Y-axis direction, and a longitudinal direction of the plurality of third strip electrodes E22A and the plurality of fourth strip electrodes E22B is arranged in a direction parallel to the X-axis direction. In other words, the plurality of first strip electrodes E21A and the plurality of second strip electrodes E21B, and the plurality of third strip electrodes E22A and the plurality of fourth strip electrodes E22B are arranged so that their longitudinal directions intersect. The intersecting angle is preferably 90±10 degrees, and more preferably 90 degrees (orthogonal).

The third liquid crystal cell 30 includes a first substrate S31 and a second substrate S32, a first electrode E31 and a second electrode E32, and a third liquid crystal layer LC3 between the first substrate S31 and the second substrate S32. The first electrode E31 is arranged between the first substrate S31 and the second liquid crystal layer LC3, and the second electrode E32 is arranged between the second substrate S32 and the second liquid crystal layer LC3.

The first electrode E31 includes a plurality of first strip electrodes E31A and a plurality of second strip electrodes E31B formed in a strip shape, the second electrode E32 includes a plurality of third strip electrodes E32A and a plurality of fourth strip electrodes E32B formed in strip shape. The plurality of first strip electrodes E31A and the plurality of second strip electrodes E31B are arranged alternately so that the comb teeth bite each other, and the plurality of third strip electrodes E32A and the plurality of fourth strip electrodes E32B are arranged alternately so that the comb teeth occlude each other.

A longitudinal direction of the plurality of first strip electrodes E31A and the plurality of second strip electrodes E31B is arranged in a direction parallel to the X-axis direction, and a longitudinal direction of the plurality of third strip electrodes E32A and the plurality of fourth strip electrodes E32B is arranged in a direction parallel to the Y-axis direction. In other words, the plurality of first strip electrodes E31A and the plurality of second strip electrodes E31B, and the plurality of third strip electrodes E32A and the plurality of fourth strip electrodes E32B are arranged so that their longitudinal directions intersect. The intersecting angle is preferably 90±10 degrees, and more preferably 90 degrees (orthogonal).

The fourth liquid crystal cell 40 includes a first substrate S41 and a second substrate S42, a first electrode E41 and a second electrode E42, and a third liquid crystal layer LC4 between the first substrate S41 and the second substrate S42. The first electrode E41 is arranged between the first substrate S41 and the second liquid crystal layer LC4, and the second electrode E42 is arranged between the second substrate S42 and the second liquid crystal layer LC4.

The first electrode E41 includes a plurality of first strip electrodes E41A and a plurality of second strip electrodes E41B formed in a strip shape, the second electrode E42 includes a plurality of third strip electrodes E42A and a plurality of fourth strip electrodes E42B formed in strip shape. The plurality of first strip electrodes E41A and the plurality of second strip electrodes E41B are arranged alternately so that the comb teeth bite each other, and the plurality of third strip electrodes E42A and the plurality of fourth strip electrodes E42B are arranged alternately so that the comb teeth occlude each other.

A longitudinal direction of the plurality of first strip electrodes E41A and the plurality of second strip electrodes E41B is arranged in a direction parallel to the X-axis direction, and a longitudinal direction of the plurality of third strip electrodes E42A and the plurality of fourth strip electrodes E42B is arranged in a direction parallel to the Y-axis direction. In other words, the plurality of first strip electrodes E41A and the plurality of second strip electrodes E41B, and the plurality of third strip electrodes E42A and the plurality of fourth strip electrodes E42B are arranged so that their longitudinal directions intersect. The intersecting angle is preferably 90±10 degrees, and more preferably 90 degrees (orthogonal).

As shown in FIG. 3, the liquid crystal light control element 102 is arranged in the same direction as the longitudinal direction of the first strip electrode E11A and the second strip electrode E11B of the first liquid crystal cell 10 and the first strip electrode E21A and the second strip electrode E21B of the second liquid crystal cell 20 and is arranged in the same direction as the longitudinal direction of the first strip electrode E31A and the second strip electrode E31B of the third liquid crystal cell 30 and the longitudinal direction of the first strip electrode E41A and the second strip electrode E41B of the fourth liquid crystal cell 40.

The longitudinal directions of the first strip electrodes E11A and the second strip electrode E11B of the first liquid crystal cell 10 and the first strip electrode E21A and the second strip electrode E21B of the second liquid crystal cell 20, and the longitudinal directions of the first strip electrode E31A and the second strip electrode E31B of the third liquid crystal cell 30 and the first strip electrode E41A and the second strip electrode E41B of the fourth liquid crystal cell 40 are arranged to intersect. This intersecting angle is preferably 90±10 degrees, and more preferably 90 degrees (orthogonal).

Similarly, the liquid crystal light control element 102 is arranged in the same direction as the longitudinal direction of the third strip electrode E12A and the fourth strip electrode E12B of the first liquid crystal cell 10 and the third strip electrode E22A and the fourth strip electrodes E22B of the second liquid crystal cell 20 and is arranged in the same direction as the longitudinal direction of the third strip electrode E32A and the fourth strip electrode E32B of the third liquid crystal cell 30 and the longitudinal direction of the third strip electrode E42A and the fourth strip electrode E42B of the fourth liquid crystal cell 40.

The longitudinal directions of the third strip electrodes E12A and the fourth strip electrode E12B of the first liquid crystal cell 10 and the third strip electrode E22A and the fourth strip electrode E22B of the second liquid crystal cell 20, and the longitudinal directions of the third strip electrode E32A and the fourth strip electrode E32B of the third liquid crystal cell 30 and the third strip electrode E42A and the fourth strip electrode E42B of the fourth liquid crystal cell 40 are arranged to intersect. The intersecting angle is preferably 90±10 degrees, and more preferably 90 degrees (orthogonal).

Thus, the first electrodes E11, E21 of the first liquid crystal cell 10 and the second liquid crystal cell 20 have an electrode shape in which a plurality of strip patterns are aligned, and their longitudinal direction is arranged parallel to the Y-axis direction, in the liquid crystal light control element 102. The first electrodes E31, E41 of the third liquid crystal cell 30 and the fourth liquid crystal cell 40 have an electrode shape in which a plurality of strip patterns are aligned, and their longitudinal direction is arranged parallel to the X-axis direction. The longitudinal directions of the strip patterns of the first electrodes E11, E21 of the first liquid crystal cell 10 and the second liquid crystal cell 20 and the longitudinal directions of the strip patterns of the first electrodes E31, E41 of the third liquid crystal cell 30 and the fourth liquid crystal cell 40 are arranged so that their longitudinal directions intersect. The intersecting angle is preferably in the range of 90±10 degrees, as described above, and it is more preferable that the crossing angles are orthogonal (90 degrees).

The first electrode E11 and the second electrode E12 arranged in the first liquid crystal cell 10, the first electrode E21 and the second electrode E22 arranged in the second liquid crystal cell 20, the first electrode E31 and the second electrode E32 arranged in the third liquid crystal cell 30, and the first electrode E41 and the second electrode E42 arranged in the fourth liquid crystal cell 40 have the same size in a plan view. Although not shown in FIG. 3, the light source unit 106 is arranged on the lower side of the first liquid crystal cell 10. Light emitted from the light source unit 106 and incident on the liquid crystal light control element 102 passes through all of the first liquid crystal cell 10, the second liquid crystal cell 20, the third liquid crystal cell 30, and the fourth liquid crystal cell 40 before being emitted.

The first liquid crystal cell 10, the second liquid crystal cell 20, the third liquid crystal cell 30, and the fourth liquid crystal cell 40 have substantially similar configurations, and will be described more specifically below using the first liquid crystal cell 10 as a representative.

Figure 4A:
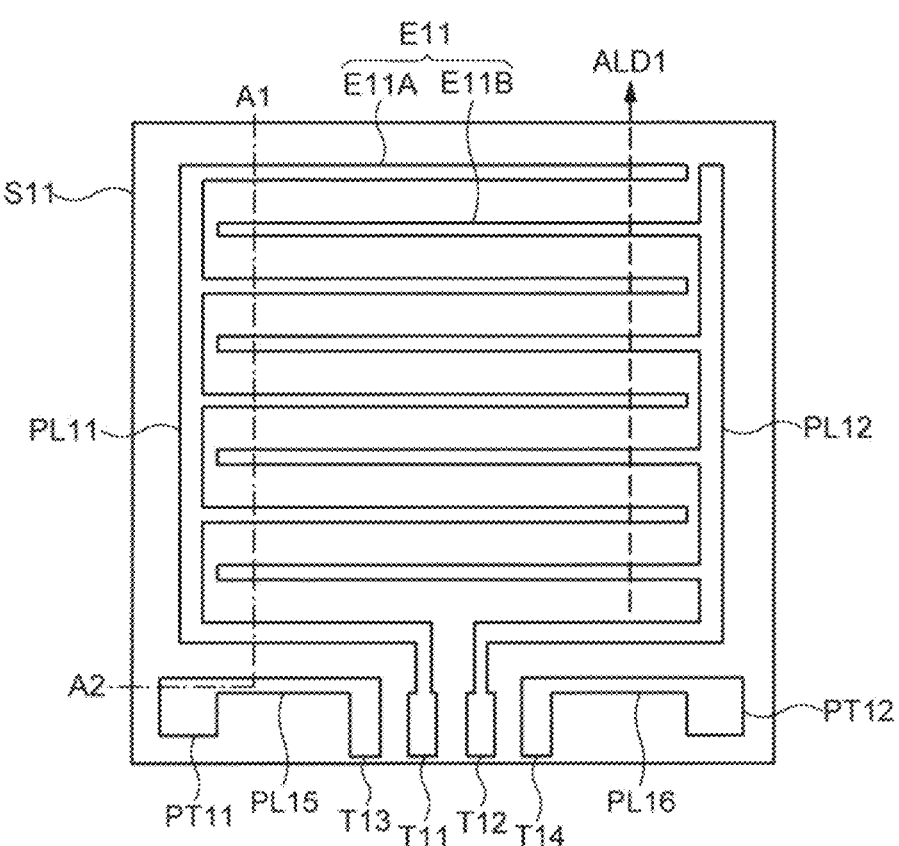
FIG. 4A is a plan view of electrodes on a first substrate of a liquid crystal cell configured with a liquid crystal light control element according to an embodiment of the present invention.
Figure 4B:
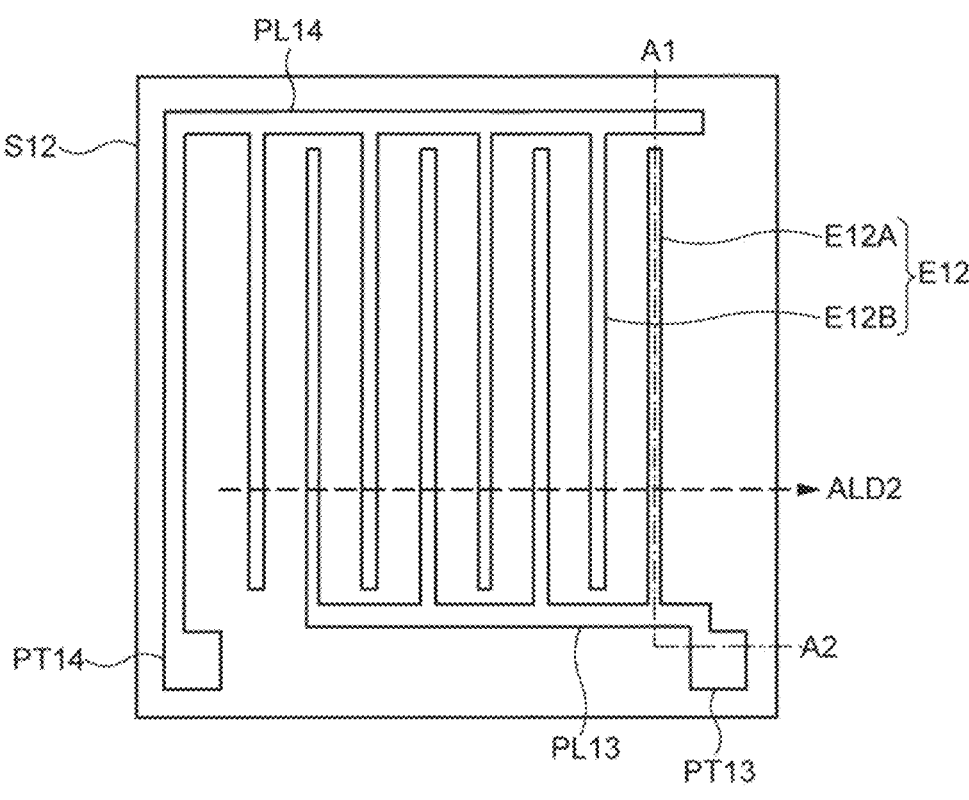
FIG. 4B is a plan view of electrodes on a second substrate of a liquid crystal cell configured with a liquid crystal light control element according to an embodiment of the present invention.

FIG. 4A shows a plan view of the first substrate S11 and FIG. 4B shows a plan view of the second substrate S12. More specifically, FIG. 4A shows a plan view of the inner surface of the first substrate S11 and FIG. 4B shows a plan view of the inner surface of the second substrate S12.

As shown in FIG. 4A, the first electrode E11 is arranged on the first substrate S11. The first electrode E11 includes the plurality of first strip electrodes E11A and the plurality of second strip electrodes E11B. The plurality of first strip electrodes E11A and the plurality of second strip electrodes E11B have a strip pattern. As shown in FIG. 4A, the plurality of first strip electrodes E11A and the plurality of second strip electrodes E11B are spaced and arranged alternately at predetermined intervals.

Each of the plurality of first strip electrodes E11A is connected to the first power supply line PL11, and each of the plurality of second strip electrodes E11B is connected to the second power supply line PL12. The first power supply line PL11 is connected to the first connection terminal T11, and the second power supply line PL12 is connected to the second connection terminal T12. The first connection terminal T11 and the second connection terminal T12 are arranged along one edge of the first substrate S11.

The third connection terminal T13 is arranged adjacent to the first connection terminal T11 and the fourth connection terminal T14 is arranged adjacent to the second connection terminal T12. The third connection terminal T13 is connected to the fifth power supply line PL15. The fifth power supply line PL15 is connected to the first power supply terminal PT11. The first power supply terminal PT11 is arranged at a predetermined position in the plane of the first substrate S11. The fourth connection terminal T14 is connected to the sixth power supply line PL16. The sixth power supply line PL16 is connected to the second power supply terminal PT12. The second power supply terminal PT12 is arranged at a predetermined position in the plane of the first substrate S11.

A different or the same voltage is applied to the plurality of first strip electrodes E11A connected to the first power supply line PL11 and the plurality of second strip electrodes E11B connected to the second power supply line PL12. When different levels of voltage are applied to the plurality of first strip electrodes E11A and the plurality of second strip electrodes E11B, an electric field (transverse electric field) is generated by the potential difference between the two electrodes.

As shown in FIG. 4B, the second electrode E12 is arranged on the second substrate S12. The second electrode E12 includes the plurality of third strip electrodes E12A and the plurality of fourth strip electrodes E12B. The plurality of third strip electrodes E12A and the plurality of fourth strip electrodes E12B have a strip pattern. As shown in FIG. 4B, the plurality of third strip electrodes E12A and the plurality of fourth strip electrodes E12B are spaced and arranged alternately at predetermined intervals.

Each of the plurality of third strip electrodes E12A is connected to the third power supply line PL13, and each of the plurality of fourth strip electrodes E12B is connected to the fourth power supply line PL14. The third power supply line PL13 is connected to the third power supply terminal PT13, and the fourth power supply line PL14 is connected to the fourth power supply terminal PT14. The third power supply terminal PT13 is arranged at a position corresponding to the first power supply terminal PT11 on the first substrate S11 side, and the fourth power supply terminal PT14 is arranged at a position corresponding to the second power supply terminal PT12 on the first substrate S11 side.

A different or the same voltage is applied to the plurality of third strip electrodes E12A connected to the third power supply line PL13 and the plurality of fourth strip electrodes E12B connected to the fourth power supply line PL14. When different levels of voltage are applied to the plurality of third strip electrodes E12A and the plurality of fourth strip electrodes E12B, an electric field (transverse electric field) is generated by the potential difference between the two electrodes.

The first connection terminal T11, the second connection terminal T12, the third connection terminal T13, and the fourth connection terminal T14 on the first substrate S11 are connected to a flexible wiring substrate which is not shown. Although the second substrate S12 side is not arranged with terminals to be connected to the flexible wiring substrate, the third power supply terminal PT13 is electrically connected to the first power supply terminal PT11 and the fourth power supply terminal PT14 is electrically connected to the second power supply terminal PT12 by a conductive material.

Figure 5:
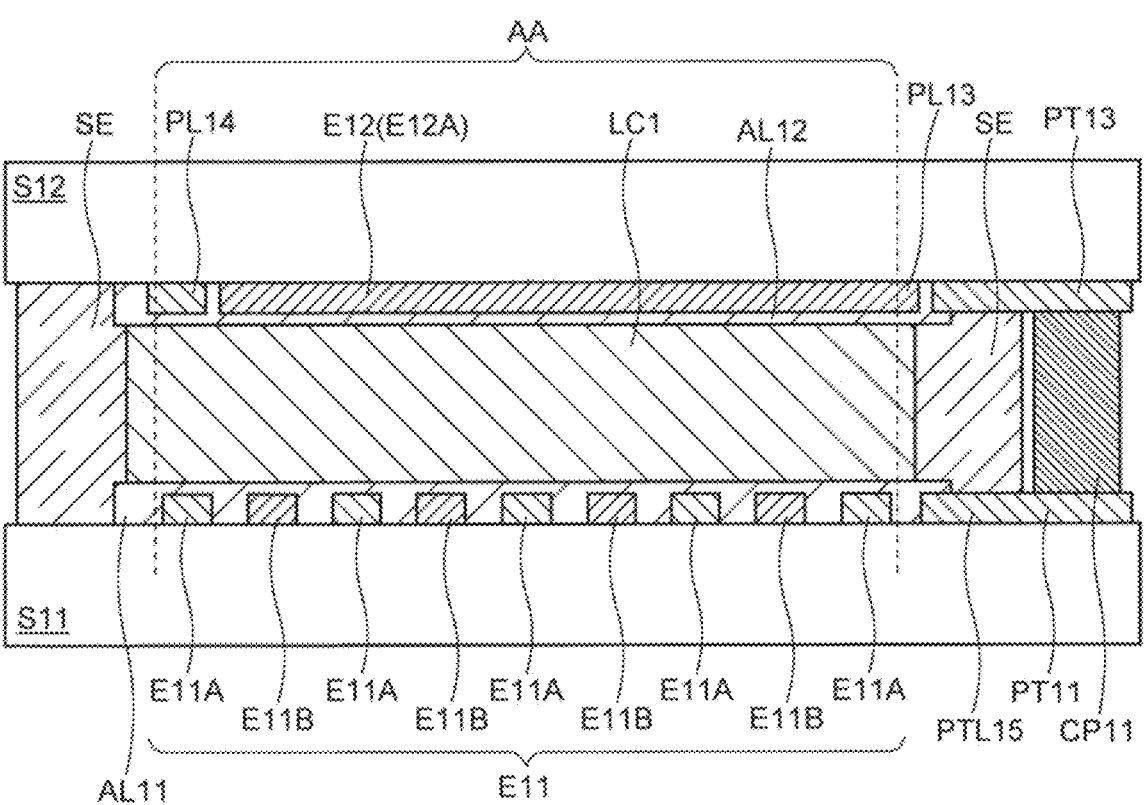
FIG. 5 is an example of a cross-sectional structure of a liquid crystal cell configured with a liquid crystal light control element according to an embodiment of the present invention.

FIG. 5 shows the cross-sectional structure of the first liquid crystal cell 10 corresponding to line A1-A2 shown in FIG. 4A and FIG. 4B.

The first liquid crystal cell 10 has an effective area AA capable of polarizing and scattering incident light. The first electrode E11 and the second electrode E12 are arranged in the effective area AA. The first substrate S11 and the second substrate S12 are arranged so that the first electrode E11 and the second electrode E12 are arranged facing each other and are bonded by a sealant SE arranged outside the effective region AA. The first liquid crystal layer LC1 is sandwiched between the first substrate S11 and the second substrate S12 is formed in the region surrounded by the sealant SE.

The first electrode E11 of the first substrate S11 includes the first strip electrode E11A and the second strip electrode E11B, and the second electrode E12 of the second substrate S12 includes the third strip electrode E12A and the fourth strip electrode E12B. FIG. 5 shows an arrangement in which the longitudinal directions of the first strip electrode E11A and the second strip electrode E11B and the longitudinal directions of the third strip electrode E12A and the fourth strip electrode E12B are arranged so that they intersect each other.

A first alignment film AL11 is arranged on the first substrate S11, and a second alignment film AL12 is arranged on the second substrate S12. The first alignment film AL11 is arranged to cover the first electrode E11, and the second alignment film AL12 is arranged to cover the second electrode E12.

The first power supply terminal PT11 and the third power supply terminal PT13 are arranged outside the sealant SE. The first power supply terminal PT11 and the third power supply terminal PT13 are electrically connected by a first conductive member CP11. The first conductive member CP11 is formed by a conductive paste material, for example, silver paste or carbon paste. Although not shown in FIG. 5, the second power supply terminal PT12 and the fourth power supply terminal PT14 are also electrically connected by the same conductive member.

The first substrate S11 and the second substrate S12 are transparent substrates, for example, glass substrate or resin substrate. The first electrode E11 and the second electrode E12 are transparent electrodes formed by a transparent conductive material such as indium tin oxide (ITO) or indium zinc oxide (IZO). The power supply lines (first power supply line PL11, second power supply line PL12, third power supply line PL13, fourth power supply line PL14, fifth power supply line PL15, sixth power supply line PL16), the connection terminals (first connection terminal T11, second connection terminal T12, third connection terminal T13, fourth connection terminal T14) and the power supply terminals (first power supply terminal PT11, second power supply terminal PT12, third power supply terminal PT13, and fourth power supply terminal PT14) are formed by metallic materials such as aluminum, titanium, molybdenum, and tungsten. The power supply lines (first power supply line PL11, second power supply line PL12, third power supply line PL13, fourth power supply line PL14, fifth power supply line PL15, sixth power supply line PL16) may be formed of the same transparent conducting film as the first electrode E11 and the second electrode E12. The first alignment film AL1 and the second alignment film AL2 are formed by horizontally oriented films having an orientation regulating force that is parallel to the primary plane of the substrate. The first liquid crystal layer LC1 is, for example, a twisted nematic liquid crystal (TN (Twisted Nematic) liquid crystal). Although not shown in FIG. 5, spacers may be arranged between the first substrate S11 and the second substrate S12 to keep the distance between the two substrates constant.

Next, with reference to FIG. 6A to FIG. 8, the electro-optical effects in the first liquid crystal cell 10 are explained. Only those configurations necessary for explanation are represented in FIG. 6A to FIG. 8.

Figure 6A:
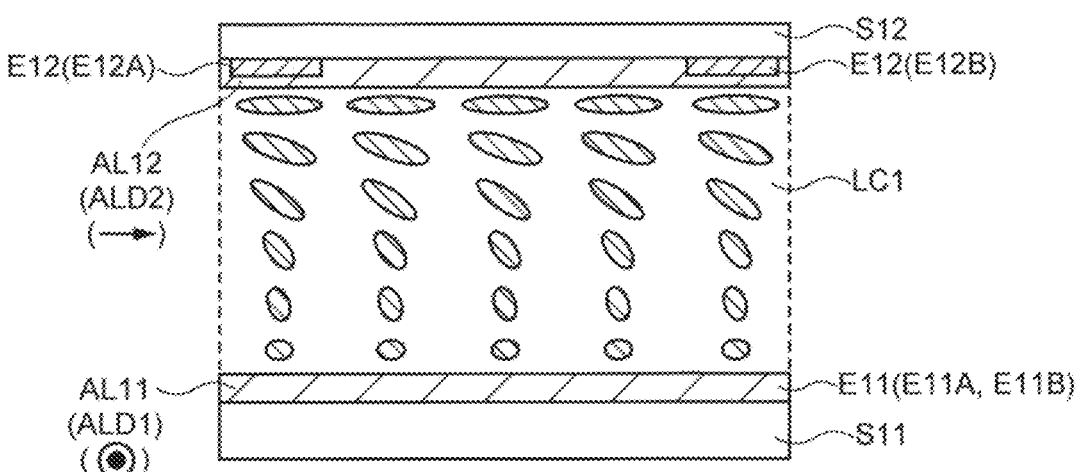
FIG. 6A is an illustration of an operation of a liquid crystal cell configured with a liquid crystal light control element according to an embodiment of the present invention, and shows an orientation state of liquid crystal molecules in a state where a voltage is not applied.
Figure 6B:
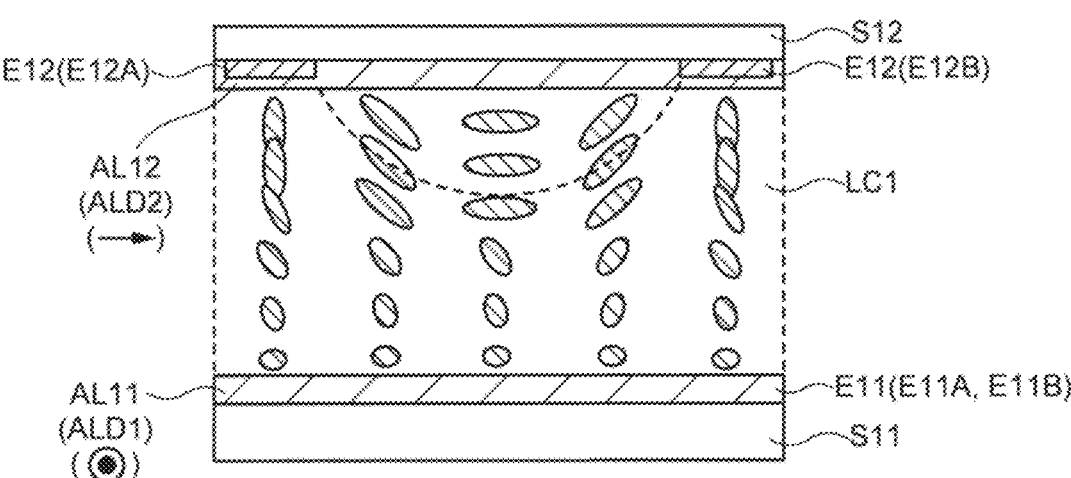
FIG. 6B is an illustration of an operation of a liquid crystal cell configured with a liquid crystal light control element according to an embodiment of the present invention, and shows an orientation state of the liquid crystal molecules in a state where a voltage is applied.

FIG. 6A and FIG. 6B show the partial cross-sectional schematic structure of the first liquid crystal cell 10. FIG. 6A shows that the first alignment film AL11 of the first substrate S11 and the second alignment film AL12 of the second substrate S12 have different alignment directions. Specifically, the alignment direction ALD1 of the first alignment film AL11 is aligned in the normal direction of a plane of paper, and the alignment direction ALD2 of the second alignment film AL12 is aligned in the left-right direction of the plane of paper. The first electrode E11 includes the first strip electrode E11A and the second strip electrode E11B, arranged so that their longitudinal directions are orthogonal to the alignment direction ALD1. The second electrode E12 includes the third strip electrode E12A and the fourth strip electrode E12B, arranged so that their longitudinal directions are orthogonal to the alignment direction ALD2. The alignment treatment of the first alignment film AL1 and the second alignment film AL2 may be a rubbing treatment or a photo-alignment treatment. An angle of intersection between the first alignment film ALD1 of the first alignment film AL1 and the first strip electrode E11A and the second strip electrode E11B, and an angle of intersection between the alignment direction ALD2 of the second alignment film AL2 and the third strip electrode E12A and the fourth strip electrode E12B are not limited to orthogonal and can be set within a range of 90 degrees±10 degrees.

TN liquid crystal is used as the first liquid crystal layer LC1. Since the alignment direction ALD1 of the first alignment film AL11 and the alignment direction ALD2 of the second alignment film AL12 are orthogonal, the liquid crystal molecules in the first liquid crystal layer LC1 are aligned from the first alignment film AL11 to the second alignment film AL12 with the long axis direction of the liquid crystal molecules twisted 90 degrees in the absence of an external electric field. FIG. 6A shows the state in which a voltage is not applied to the first strip electrode E11A and the second strip electrode E11B, and the long axis direction of the liquid crystal molecules is aligned twisted by 90 degrees. Specifically, a long axis direction of the liquid crystal molecules is aligned in the normal direction of the plane of paper on the side of the first alignment film AL11, and the long axis direction of the liquid crystal molecules is aligned in the left-right direction of the plane of paper on the side of the second alignment film AL12.

FIG. 6A shows an example where the first liquid crystal layer LC1 is formed by positive type twisted nematic liquid crystal (TN liquid crystal) and the long axis of the liquid crystal molecules is aligned in the same direction as the alignment direction of the alignment film, but the alignment direction of the alignment film is rotated 90 degrees. That is, it is possible to use negative liquid crystals by aligning the orientation direction of each alignment film AL11, AL12 with the extending direction of the first strip electrode E11A of the first substrate S11 and the second strip electrode E12A of the second substrate S12. The liquid crystal should contain a chiral agent that imparts twist to the liquid crystal molecules.

FIG. 6B shows a state in which the first strip electrode E11A and the second strip electrode E11B are fixed at the same potential (for example, ground potential), a low-level voltage VL is applied to the third strip electrode E12A, and a high-level voltage VH is applied to the fourth strip electrode E12B. In this state, the electric field is not generated on the first substrate S11 side, and the transverse electric field is generated between the third strip electrode E12A and the fourth strip electrode E12B. As shown in FIG. 6B, the liquid crystal molecules on the second substrate S12 side change their alignment direction under the influence of the transverse electric field. That is, the alignment of the liquid crystal molecules on the second substrate S12 side changes so that the long axis direction is aligned parallel to the direction of the electric field.

Figure 6C:
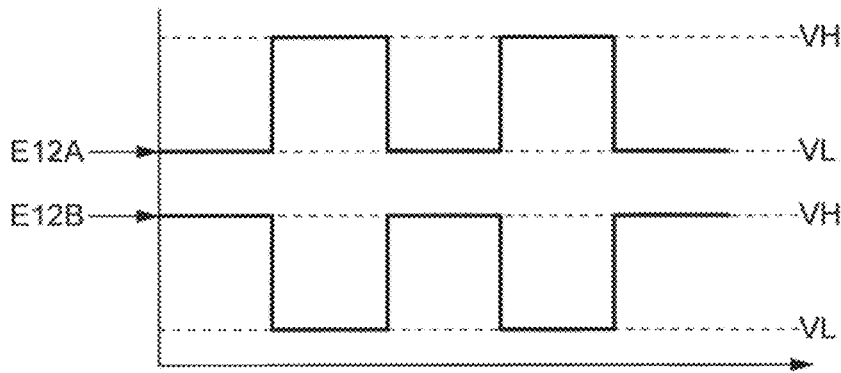
FIG. 6C is a diagram illustrating an operation of a liquid crystal cell configured with a liquid crystal light control element according to an embodiment of the present invention, and shows waveforms of control signals applied to the electrodes that drive the liquid crystal.

The values of the low-level voltage VL and the high-level voltage VH applied to the third strip electrode E12A and the fourth strip electrode E12B are set appropriately. For example, 0 V is applied as the low-level voltage VL1 and 5 to 30 V as the high-level voltage VH1. A voltage that alternates between the low-level voltage VL and the high-level voltage VH is applied to the third strip electrode E12A and the fourth strip electrode E12B. For example, as shown in FIG. 6C, in a certain period of time, the low-level voltage VL is applied to the third strip electrode E12A and the high-level voltage VH is applied to the fourth strip electrode E12B, in the next fixed period, the high-level voltage VH is applied to the third strip electrode E12A and the low-level voltage VL is applied to the fourth strip electrode E12B, so that the voltage levels between the two electrodes change synchronously and periodically.

The alternating electric field can be generated by alternately applying the low-level voltage VL and the high-level voltage VH to the third strip electrode E12A and the fourth strip electrode E12B, and it is possible to suppress the degradation of the first liquid crystal layer LC1. The frequency of the voltage applied to the third strip electrode E12A and the fourth strip electrode E12B may be selected as long as the frequency at which the liquid crystal molecules can follow the change in the electric field, for example, a frequency in the range of 15 to 100 Hz. The potential applied to the first strip electrode E11A and the second strip electrode E11B may be an intermediate potential between the potential of the low-level voltage and the potential of the high-level voltage described above.

Figure 7A:
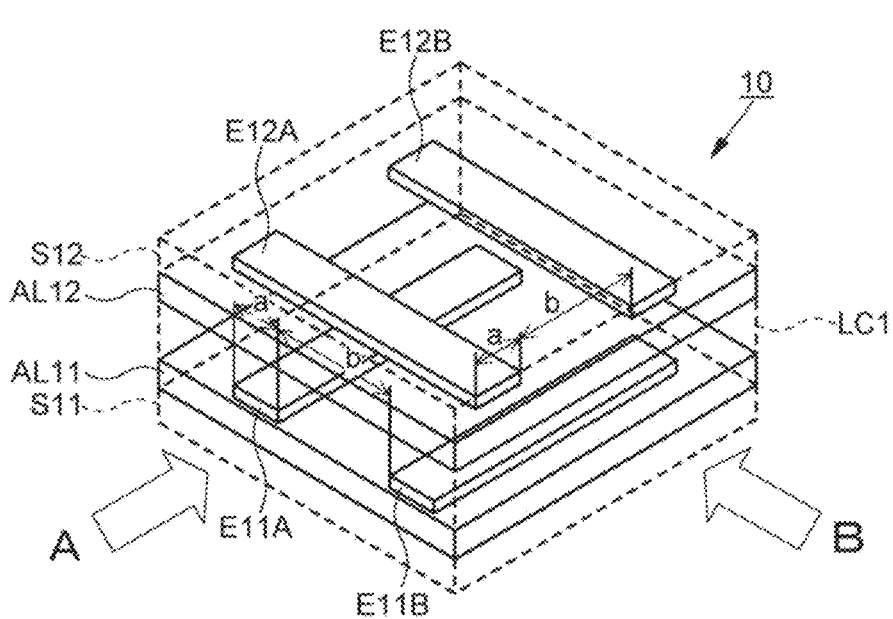
FIG. 7A is an illustration of an operation of a liquid crystal cell configured with a liquid crystal light control element according to an embodiment of the present invention, and shows a diagram of the arrangement of a first electrode and a second electrode.
Figure 7B:
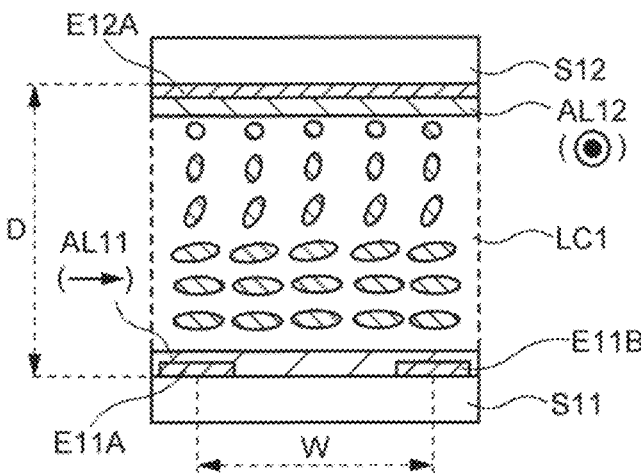
FIG. 7B is an illustration of an operation of a liquid crystal cell configured with a liquid crystal light control element according to an embodiment of the present invention, and shows an orientation state of the liquid crystal molecules when a voltage is applied to the first electrode.
Figure 7C:
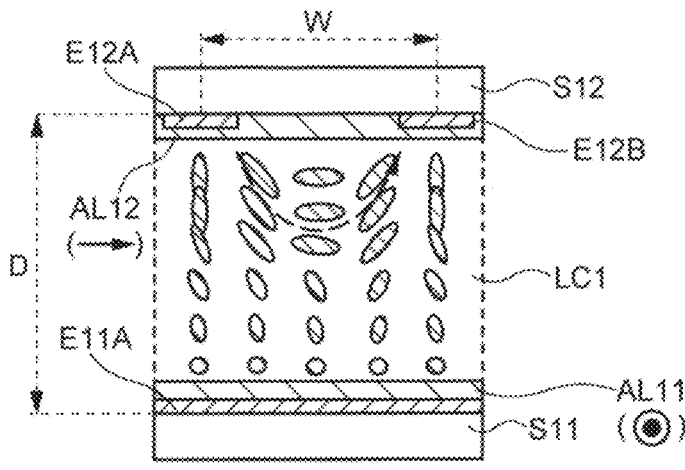
FIG. 7C is an illustration of an operation of a liquid crystal cell configured with a liquid crystal light control element according to an embodiment of the present invention, and shows an alignment state of liquid crystal molecules when a voltage is applied to the second electrode.

FIG. 7A is a partial perspective view of the first liquid crystal cell 10, showing the first strip electrode E11A and the second strip electrode E11B, the first alignment film AL1, the third strip electrode E12A and the fourth strip electrode E12B, the second alignment film AL2, and the first liquid crystal layer LC1. FIG. 7B and FIG. 7C show cross-sectional schematic views of the first liquid crystal cell 10. FIG. 7B shows a cross-sectional schematic diagram of the first liquid crystal cell 10 from side A shown in FIG. 7A, and FIG. 7C shows a cross-sectional schematic diagram from side B shown in the figure. FIG. 7B and FIG. 7C show that the alignment direction ALD1 of the first alignment film AL11 and the alignment direction ALD2 of the second alignment film AL12 intersect.

As shown in FIG. 7A and FIG. 7C, the first strip electrode E11A and the second strip electrode E11B are arranged at a center-to-center distance W, and the third strip electrode E12A and the fourth strip electrode E12B are also arranged at a center-to-center distance W. This center-to-center distance W has the relationship W=a+b with respect to the width a of the first strip electrode E11A shown in FIG. 7A and the distance b from the edge of the first strip electrode E11A to the edge of the second strip electrode E11B. The first strip electrode E11A and the second strip electrode E11B and the third strip electrode E12A and the fourth strip electrode E12B are arranged facing each other at a distance and orthogonally to each other. The first substrate S11 and the second substrate S12 are arranged facing each other at a spacing D, and the distance D corresponds substantially to the thickness of the first liquid crystal layer LC1. In practice, the first strip electrode E11A and the first alignment film AL11 are arranged on the first substrate S11, and the third strip electrode E12A and the second alignment film AL12 are arranged on the second substrate S12, since the thickness of these electrodes and alignment films is sufficiently small compared to the distance D, the thickness of the first liquid crystal layer LC1 can be viewed as the same as the distance D.

The distance D is preferably equal to or greater than the center-to-center distance W of the strip electrodes in the first liquid crystal cell 10. That is, the distance D is preferably one or more times as long as the center-to-center distance W. For example, it is preferable that the distance D is at least twice as large as the center-to-center distance W of the strip electrodes. When the width of the first strip electrode E11A is 5 μm, the width "a" of the first strip electrode E11A and the second strip electrode E11B is 5 μm, the distance b from the edge of the first strip electrode E11A to the edge of the second strip electrode E11B is 5 μm, and the center-to-center distance W of the strip electrodes is 10 μm. In contrast, it is preferable that the distance D is larger than 10 μm.

It is possible to suppress mutual interference between the electric fields on the sides of the first strip electrode E11A and the second strip electrode E11B and the electric fields on the sides of the third strip electrode E12A and the fourth strip electrode E12B, by having such a relationship of the center-to-center distance W of the strip electrodes and the above distance D. That is, when the alignment of the liquid crystal molecules in the vicinity of the third strip electrode E12A and the fourth strip electrode E12B is controlled by the electric field generated between them as shown in FIG. 7B and FIG. 7C, it is possible not to affect the alignment of the liquid crystal molecules in the vicinity of the first strip electrode E11A and the second strip electrode E11B.

It is known that the refractive index of liquid crystals changes depending on their alignment state. As shown in FIG. 6A, in the off state in which no electric field is applied to the first liquid crystal layer LC1, the long axis direction of the liquid crystal molecules is aligned horizontally on the substrate surface and twisted 90 degrees from the first substrate S11 side to the second substrate S12 side. The liquid crystal layer LC1 has an almost uniform refractive index distribution in this alignment state. Therefore, a first polarized component PL1 and a second polarized component PL2 orthogonal to the first polarized component PL1 (refer to FIG. 8) of incident light into the first liquid crystal cell 10 are affected by the initial alignment of the liquid crystal molecules and make optical rotation, but almost without being refracted (or scattered), and pass through the first liquid crystal layer LC1. Here, the first polarized component PL1 corresponds to, for example, P-polarized natural light, and the second polarized component corresponds to, for example, S-polarized natural light.

On the other hand, as shown in FIG. 6B, in the on (ON) state in which a voltage is applied to the third strip electrode E12A and the fourth strip electrode E12B and an electric field is formed, when the first liquid crystal layer LC1 has positive dielectric anisotropy, the liquid crystal molecules are aligned so that their long axis follows the electric field. As a result, as shown in FIG. 6B, a region is formed where the liquid crystal molecules stand almost vertically above the third strip electrode E12A and the fourth strip electrode E12B, a region is formed where the liquid crystal molecules align obliquely along the distribution of the electric field between the third strip electrode E12A and the fourth strip electrode E12B, and a region is formed where the initial alignment state is maintained in a region away from the third strip electrode E12A and the fourth strip electrode E12B.

As shown in FIG. 6B, the long axis of the liquid crystal molecules is aligned in a convex arc along the direction in which the electric field occurs between the electrodes of the third strip electrode E12A and the fourth strip electrode E12B. That is, as shown in FIG. 6A and FIG. 6B, the direction of the initial alignment of the liquid crystal molecules and the direction of the transverse electric field generated between the third strip electrode E12A and the fourth strip electrode E12B are the same, as shown schematically in FIG. 6B, and the direction of alignment of the liquid crystal molecules located in the center between the two electrodes changes little. However, the liquid crystal molecules located from the center to both electrodes are aligned in a direction normal to the surface of the second substrate S12 (tilted) according to the intensity distribution of the electric field. Therefore, the liquid crystal molecules are aligned in a circular arc between the third strip electrode E12A and the fourth strip electrode E12B.

As explained in FIG. 7B and FIG. 7C, the thickness of the liquid crystal layer LC1 is sufficiently thick so that even if the alignment of the liquid crystal molecules changes on the second substrate S12 side, the liquid crystal molecules on the first substrate S11 side remain in their initial alignment.

Liquid crystal molecules have a refractive index anisotropy Δn. Therefore, the first liquid crystal layer LC1 in the on state has a refractive index distribution or retardation distribution according to the alignment state of the liquid crystal molecules. The retardation is expressed as Δn×d when the thickness of the first liquid crystal layer LC1 is d. In the on state, the first polarized component PL1 is diffused under the influence of the refractive index distribution of the first liquid crystal layer LC1 when it passes through the first liquid crystal layer LC1. Since an arc-shaped dielectric constant distribution is formed in the liquid crystal layer LC1, the incident light (polarized component parallel to the direction of the initial alignment of the liquid crystal molecules) will be diffused radially.

Figure 8:
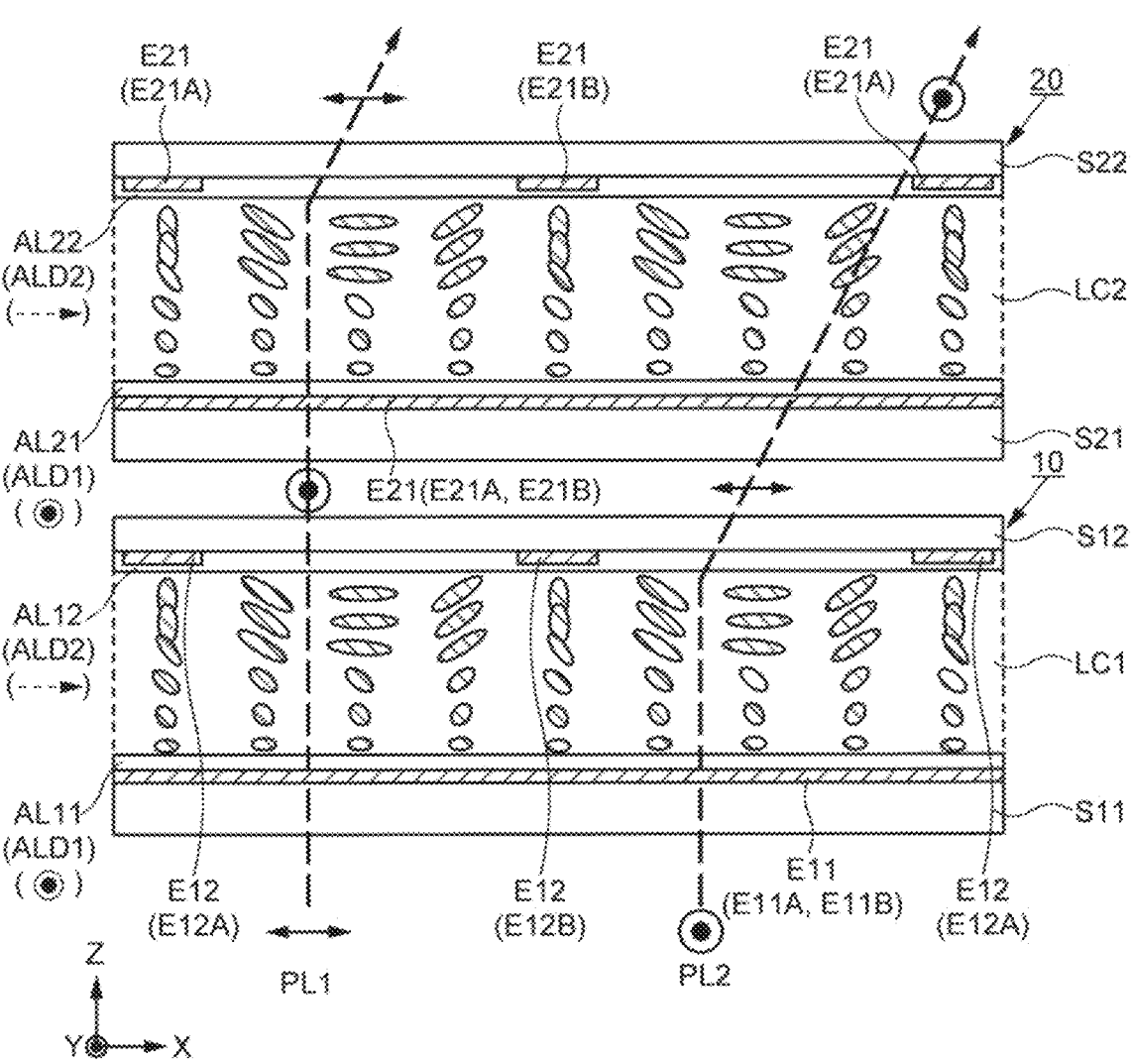
FIG. 8 is a schematic diagram of a phenomenon in which a first polarized component and a second polarized component are diffused by two liquid crystal cells.

FIG. 8 schematically shows the phenomenon of diffusion of the first polarized component PL1 and the second polarized component PL2 by the liquid crystal layers. Here, it is considered that the directions of the X, Y and Z axes used for explanation are in the relationship shown in FIG. 8. That is, FIG. 8 indicates that the X-axis is in the left/right direction of plane of paper, the Y-axis is in the normal direction of plane of paper, and the Z-axis is in the up/down direction of plane of paper.

FIG. 8 shows the first liquid crystal cell 10 and the second liquid crystal cell 20 stacked together, and the first substrates S11, S21, second substrates S12, S22, first strip electrodes E11A, E21A, second strip electrodes E11B, E21B, first alignment films AL11, AL21, second alignment films AL12, AL22, first liquid crystal layer LC1 and the second liquid crystal layer LC2 of each liquid crystal cell are shown. Here, the first transparent adhesive layer TA1, which is arranged between the first liquid crystal cell 10 and the second liquid crystal cell 20, is omitted.

The longitudinal directions of the first strip electrode E11A and the second strip electrode E11B of the first liquid crystal cell 10 and the first strip electrode E21A and the second strip electrode E21B of the second liquid crystal cell 20 are arranged in the X-axis direction, and the longitudinal directions of the third strip electrode E12A and the fourth strip electrode E12B of the first liquid crystal cell 10 and the third strip electrode E22A and the fourth strip electrode E22B of the second liquid crystal cell 20 are aligned in the Y-axis direction. The alignment direction ALD1 of the first alignment films AL11, AL21 is the same direction as the Y-axis direction, and the alignment direction ALD2 of the second alignment films AL12, AL22 is the same direction as the X-axis direction. Therefore, the liquid crystal molecules in the first liquid crystal layer LC1 and the second liquid crystal layer LC2, in which the alignment direction is regulated by the alignment film, are aligned with the long axis in the Y-axis direction on the first substrates S11, S21 side and with the long axis in the X-axis direction on the second substrates S12, S22 side.

FIG. 8 schematically shows the process of light containing the first polarized component PL1 and the second polarized component PL2 entering from the side of the first liquid crystal cell 10 and exiting from the second liquid crystal cell 20. Here, the polarization axis of the first polarized component PL1 is in the same direction as the X-axis direction, and the polarization axis of the second polarized component PL2 is in the same direction as the Y-axis direction. In other words, the polarization axis of the first polarized component PL1 is in the direction orthogonal to the alignment direction ALD1 of the first alignment films AL11, AL21 and parallel to the alignment direction ALD2 of the second alignment films AL12, AL22, and the polarization axis of the second polarized component PL2 is in the direction parallel to the alignment direction ALD1 of the first alignment films AL11, AL21 and orthogonal to the alignment direction ALD2 of the second alignment films AL12, AL22.

FIG. 8 shows the first strip electrode E11A and the second strip electrode E11B of the first liquid crystal cell 10 are at the same potential (or the same voltage is applied to both strip electrodes), and the third strip electrode E12A and the fourth strip electrode E12B are at the low-level of voltage VL applied to one of them and the high-level of voltage VH applied to the other. The same applies to the second liquid crystal cell 20, with the first strip electrode E21A and the second strip electrode E21B at the same potential (or the same voltage applied to both strip electrodes), and the third strip electrode E22A and the fourth strip electrode E22B are at the low-level voltage VL applied to one of them and the high-level voltage VH applied to the other.

By the effect of the electric field generated by the third strip electrode E12A and the fourth strip electrode E12B of the first liquid crystal cell 10, the liquid crystal molecules on the second substrate S12 side of the first liquid crystal layer LC1 form vertically rising regions, a diagonally oriented region along the distribution of the electric field, and a region where the initial alignment state is maintained. Similarly, by the effect of the electric field generated by the third strip electrode E22A and the fourth strip electrode E22B of the second liquid crystal cell 20, the liquid crystal molecules on the second substrate S22 side of the second liquid crystal layer LC2 form a vertically rising region, a diagonally oriented region along the distribution of the electric field, and a region where the initial orientation state is maintained. On the other hand, the liquid crystal molecules on the first substrate S11 side of the first liquid crystal cell 10 and the liquid crystal molecules on the first substrate S21 side of the second liquid crystal cell 20 are maintained in their initial alignment state.

Next, the effects when the first polarized component PL1 and the second polarized component PL2 are subjected to from the first liquid crystal layer LC1 and the second liquid crystal layer LC2 when they pass through the first liquid crystal cell 10 and the second liquid crystal cell 20 in such a state are explained.

The first polarized component PL1 incident on the first liquid crystal cell 10 is optically rotated by the first liquid crystal layer LC1 and the polarization axis transition from the X-axis direction to the Y-axis direction (it can also be expressed that the first polarized component PL1 changes to the second polarized component PL2). The first liquid crystal layer LC1 is affected by the transverse electric field formed by the third strip electrode E12A and the fourth strip electrode E12B on the second substrate S12 side, and the long axis of the liquid crystal molecules is aligned in a convex arc shape, as explained with reference to FIG. 7C. However, whereas the polarization axis of the polarized component polarized from the first polarized component PL1 to the second polarized component PL2 is in the Y-axis direction, since the alignment direction of the liquid crystal molecules on the second substrate S12 side is in the X-axis direction, this polarized component is not diffused and passes through the first liquid crystal layer LC1.

The polarized component, which is optically rotated 90 degrees in polarization axis by transmission through the first liquid crystal cell 10 and results in the second polarized component PL2, again optically rotates 90 degrees in polarization axis direction to change to the first polarized component PL1 when passing through the second liquid crystal cell 20 under the effect of the second liquid crystal layer LC2. The second liquid crystal cell 20 is aligned with the long axis of the liquid crystal molecules on the second substrate S22 side of the second liquid crystal layer LC2 in the form of a convex arc shape. Since the second liquid crystal layer LC2 has a refractive index distribution corresponding to the alignment state of the liquid crystal molecules, the polarized components in the same direction as the alignment direction of the liquid crystal molecules are diffused in the X-axis direction according to the change in the refractive index distribution of the liquid crystal molecules. That is, since the polarization axis of the polarized component polarized from the second polarized component PL2 to the first polarized component PL1 is in the X-axis direction and the alignment direction of the liquid crystal molecules on the second substrate S22 side is also in the X-axis direction, this polarized component is diffused in the X-axis direction when it passes through the second liquid crystal layer LC2.

On the other hand, the second polarized component PL2 incident on the first liquid crystal cell 10 is optically rotated by the first liquid crystal layer LC1, and the polarization axis changes from the Y-axis direction to the X-axis direction (it can also be expressed that the second polarized component PL2 changes to the first polarized component PL1). The long axis of the liquid crystal molecules in the first liquid crystal layer LC1 is aligned in a convex arc shape under the influence of the transverse electric field formed by the third strip electrode E12A and the fourth strip electrode E12B on the second substrate S12 side. Since the first liquid crystal layer LC1 has a refractive index distribution corresponding to the alignment state of the liquid crystal molecules, the polarized component in the same direction as the alignment direction of the liquid crystal molecules diffuses in the X-axis direction according to the change in the refractive index distribution of the liquid crystal molecules. That is, since the polarization axis of the polarized component polarized from the second polarized component PL2 to the first polarized component PL1 and the alignment direction of the long axis of the liquid crystal molecules on the second substrate S12 side are in the same X-axis direction, this polarized component is diffused in the X-axis direction on the second substrate S12 side when it passes through the first liquid crystal layer LC1.

The polarized component that is optically rotated 90 degrees in polarization axis by passing through the first liquid crystal cell 10 and transformed from the second polarized component PL2 to the first polarized component PL1, optically rotates 90 degrees again in the direction of polarization axis to change to the second polarized component PL2 under the effect of the second liquid crystal layer LC2 when it passes through the second liquid crystal cell 20. The second liquid crystal cell 20 is aligned with the long axis of the liquid crystal molecules on the second substrate S22 side of the second liquid crystal layer LC2 in the form of a convex arc shape. Since the polarization axis of the polarized component polarized from the first polarized component PL1 to the second polarized component PL2 by the second liquid crystal layer LC2 is in the Y-axis direction and the alignment direction of the liquid crystal molecules on the second substrate S22 side is in the X-axis direction, this polarized component passes through the second liquid crystal layer LC2 without being diffused.

Thus, the first polarized component PL1 is optically rotated twice when passing through the first liquid crystal cell 10 and the second liquid crystal cell 20, and is diffused once in the X-axis direction on the second substrate S22 side. The second polarized component PL2 is optically rotated twice when passing through the first liquid crystal cell 10 and the second liquid crystal cell 20, and is diffused once in the X-axis direction on the second substrate S12 side. In other words, the first polarized component PL1 and the second polarized component PL2 are not diffused on the first substrate S11 and the second substrate S21 side, but are diffused in the X-axis direction on the second substrate S12 or the second substrate S22 side after being optically rotated by the liquid crystal layer.

As describe above, it is possible to reduce the loss of light during optical rotation by having each polarized component be optically rotated in the liquid crystal layer and then diffused. In other words, it is possible to reduce the loss of light during optical rotation and suppress the disturbance of the shape of the light distribution pattern by preventing each polarization component from diffusing before it is optically rotated.

As is clear from the above, two liquid crystal cells having the same structure are stacked, and the direction of polarization of light passing through these two liquid crystal cells is changed twice, resulting in a state in which the direction of polarization is unchanged before and after the incident light is emitted. At the same time, it is possible to diffuse the light passing through the cell, by forming a convex arc shaped refractive index distribution on the second substrate side (opposite to the incident side of light) of each liquid crystal cell. Specifically, it is possible for light of the second polarized component PL2 to be diffused in the X-axis direction after being optically rotated by the first liquid crystal cell 10, and for light of the first polarized component PL1 to be diffused in the X-axis direction after being optically rotated by the second liquid crystal cell 20. That is, it is possible to diffuse light without changing the polarization state of light, by stacking the first liquid crystal cell 10 and the second liquid crystal cell 20 and forming a refractive index distribution in the liquid crystal layer on the second substrate side (opposite side of light incidence) of each liquid crystal cell.

As described above, it is possible to change the polarization direction of the incident light twice so that the polarization direction does not change before and after the light passes through the two liquid crystal cells by stacking two liquid crystal cells having the same structure. At the same time, it is possible to refract the light that passes through in a specific direction, by applying the transverse electric field on the substrate, which is the opposite side of the liquid crystal layer from the light-entering side, and forming a refractive index distribution. More specifically, it is possible for the first liquid crystal cell 10 to diffuse the light of the second polarized component PL2 in the X-axis direction after it has been optically rotated, and for the second liquid crystal cell 20 to diffuse the light of the first polarized component PL1 in the X-axis direction after it has been optically rotated.

Thus, with respect to incident light passing through the first liquid crystal layer LC1 and the second liquid crystal layer LC2, the first polarized component PL1 is diffused by the second liquid crystal layer LC2, and the second polarized component PL2 is diffused by the first liquid crystal layer LC1. The incident light passing through the first liquid crystal layer LC1 and the second liquid crystal layer LC2 is optically rotated 90 degrees by the first liquid crystal layer LC1 and the second liquid crystal layer LC2, respectively. In other words, the incident light containing the first polarized component PL1 and the second polarized component PL2 is diffused by the first liquid crystal cell 10 and the first polarized component PL1 is diffused by the second liquid crystal cell 20. That is, it is possible to control the diffusion of specific polarized components individually, thereby controlling the light distribution of light emitted from the light source, by overlapping the first liquid crystal cell 10 and the second liquid crystal cell 20.

Figure 9:
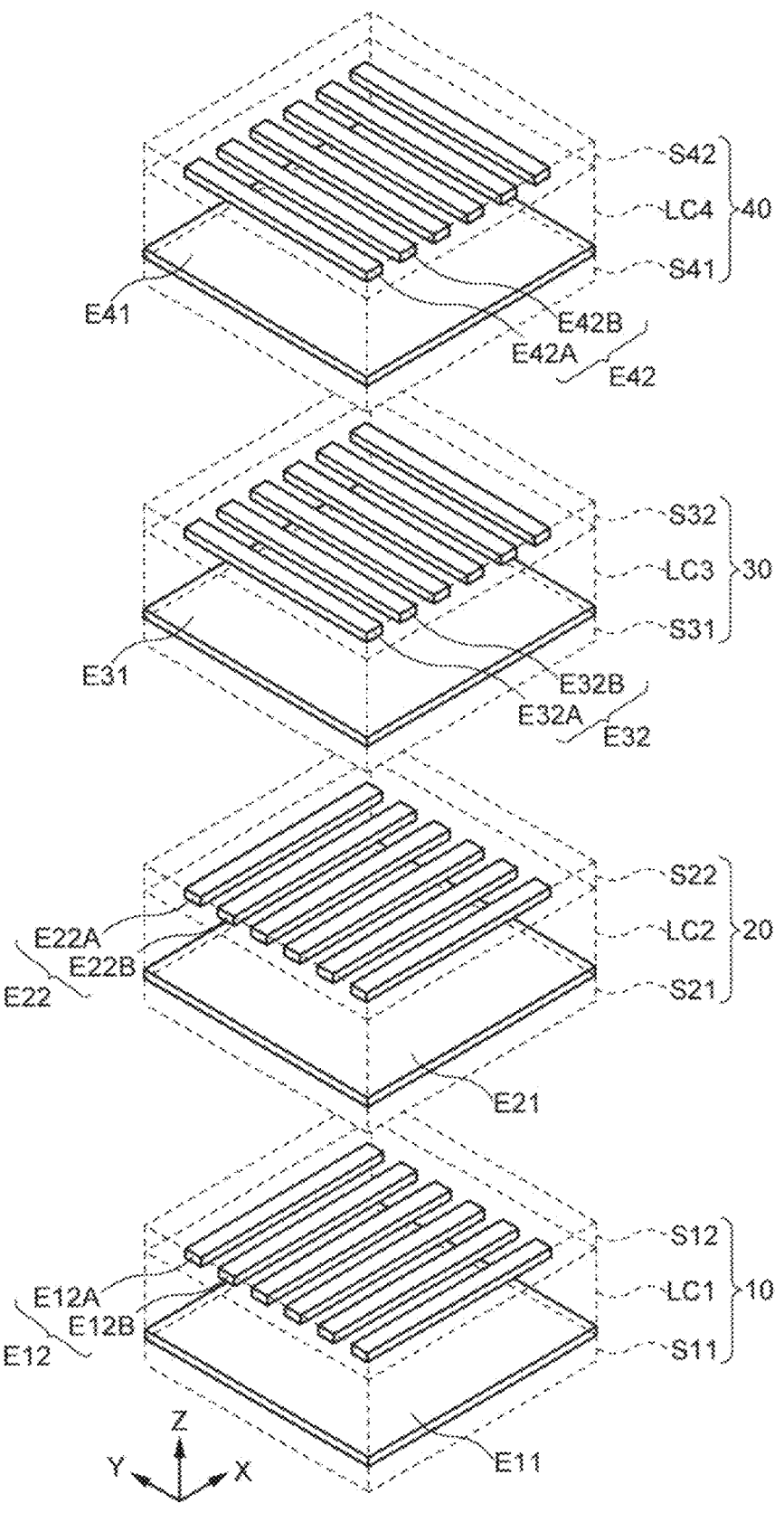
FIG. 9 is a diagram showing an arrangement of electrodes of a first liquid crystal cell, a second liquid crystal cell, a third liquid crystal cell, and a fourth liquid crystal cell that configure a liquid crystal light control element according to an embodiment of the present invention.

FIG. 3 shows an example where the first electrode E11 and the second electrode E12 of the first liquid crystal cell 10 have the same configuration of strip electrodes, but the configuration of the first electrode E11 is not limited to this example. For example, as shown in FIG. 9, the first electrode E11 may be formed by a flat plate electrode (solid electrode) corresponding to the entire surface of the first liquid crystal layer LC1. The same is true for the second liquid crystal cell 20, the third liquid crystal cell 30, and the fourth liquid crystal cell 40. The liquid crystal light control element 102 according to the present embodiment does not form a convex arc shaped refractive index distribution by the first electrode arranged on the light incident side, so the same effect can be obtained even if the first electrode is formed by a flat plate electrode (solid electrode).

Light is refracted at the boundary surfaces of different media, and it is known that the refraction angle varies depending on the wavelength of the light. When light is incident on a liquid crystal layer in which a refractive index distribution is formed, the refracting angle differs for each wavelength, and depending on the type of light source and the distance from the object to be irradiated, color breaking may be visible in the peripheral areas of the light distribution pattern formed by transmitting light to the liquid crystal light control element 102.

In contrast, the liquid crystal light control element 102 according to the present embodiment can prevent color breaking by overlapping four liquid crystal cells on the light path of the light source and arranging at least two of the four liquid crystal cells 90 degrees rotated with respect to the other liquid crystal cells, as shown in FIG. 3 and FIG. 9. That is, the liquid crystal light control element 102 according to the present embodiment can not only reduce the light loss during the optical rotation and prevent the light distribution pattern from being disturbed, it also can suppress the color breaking of the light distribution pattern.

The following is a detailed description of the configuration and operation of the liquid crystal light control element 102, which is an embodiment of the present invention, in several embodiments.

First Embodiment

FIG. 10 shows the arrangement of the strip electrodes in each liquid crystal cell of the liquid crystal light control element 102 of the first embodiment and the mode in which the polarization state and diffusion of the incident light is controlled by each liquid crystal cell. In this embodiment, the arrangement of each electrode in the first liquid crystal cell 10, second liquid crystal cell 20, the third liquid crystal cell 30, and the fourth liquid crystal cell 40 is similar to the structure shown in FIG. 3.

The liquid crystal light control element 102 has the same alignment direction of the liquid crystals in the first liquid crystal cell 10 and the second liquid crystal cell 20, and the longitudinal directions of the strip electrodes (E11A, E11B, E21A, E21B) in the first electrodes E11, E21 are oriented in the same direction, and the longitudinal directions of the strip electrodes (E12A, E12B, E22A, E22B) in the second electrodes E12, E22 that intersect these electrodes are oriented in the same direction. The alignment direction of the liquid crystal in the third liquid crystal cell 30 and the fourth liquid crystal cell 40 is the same, and the longitudinal direction of the strip electrodes (E31A, E31B, E41A, E41B) in the first electrodes E31, E41 is oriented in the same direction, and the strip electrodes of the second electrodes E32, E42 that intersect these electrodes (E32A, E32B, E42A, E42B) are oriented in the same longitudinal direction. The longitudinal direction of the strip electrodes (E12A, E12B, E22A, E22B) of the second electrodes E12, E22 in the first liquid crystal cell 10 and the second liquid crystal cell 20 and the longitudinal direction of the strip electrodes (E32A, E32B, E42A, E42B) of the second electrodes E32, E42 in the third liquid crystal cell 30 and the fourth liquid crystal cell 40 intersect at an angle of 90 degrees.

The first electrode (E11, E21, E31, E41) and the second electrode (E12, E22, E32, E42) of each liquid crystal cell are orthogonal to each other in the direction of extension. The same is true for the embodiments shown in FIG. 13, FIG. 14, and FIG. 15 described below. A configuration in which the third liquid crystal cell 30 and the fourth liquid crystal cell 40 are stacked with respect to the first liquid crystal cell 10 and the second liquid crystal cell 20 and rotated within a range of 90±10 degrees can also be adopted. A configuration in which the direction of extension of the first electrode (E11, E21, E31, E41) and the second electrode (E12, E22, E32, E42) of each liquid crystal cell is set in the range of 90±10 degrees can also be adopted.

FIG. 10 shows the arrangement of the electrodes, the direction of alignment by the alignment film (arrows), and the initial alignment of the liquid crystal molecules in the first liquid crystal cell 10, the second liquid crystal cell 20, the third liquid crystal cell 30, and the fourth liquid crystal cell 40. The liquid crystal layer is formed by positive liquid crystal, and in the initial state when control signals are not input to each liquid crystal cell, the long axis direction of the liquid crystal is aligned in the direction that intersects (orthogonally) with the strip electrodes. That is, the alignment direction of the alignment film (first alignment film) on the first substrate S11, S21, S31, S41 side and the longitudinal direction of the first electrodes E11, E21, E31, E41 having a strip pattern are arranged so that they intersect with each other, and the alignment direction of the alignment film (second alignment film) on the second substrate S12, S22, S32, S42 side and the longitudinal direction of the second electrodes E12, E22, E32, E42 having a strip pattern are arranged so that they intersect, in the first LCD cell 10, the second LCD cell 20, the third LCD cell 30, and the fourth LCD cell 40.

According to the arrangement shown in FIG. 10, the alignment films (not shown) on the first substrate S11, S21 of the first liquid crystal cell 10 and the second liquid crystal cell 20 are aligned in a direction parallel to the X-axis direction, and the alignment films (not shown) on the second substrate S12, S22 are aligned in a direction parallel to the Y-axis direction. Thus, the longitudinal direction of the strip patterns of the first electrodes E11, E21 in the first liquid crystal cell 10 and the second liquid crystal cell 20 is aligned parallel to the Y-axis direction, and the longitudinal direction of the strip patterns of the second electrodes E12, E22 is aligned parallel to the X-axis direction. The alignment direction of the alignment films (not shown) on the first substrates S31, S41 of the third liquid crystal cell 30 and the fourth liquid crystal cell 40 are aligned parallel to the Y-axis direction, and the alignment direction of the alignment films (not shown) on the second substrates S32, S42 are aligned parallel to the X-axis direction. Thus, in the third liquid crystal cell 30 and the fourth liquid crystal cell 40, the longitudinal direction of the strip patterns of the first electrodes E31, E41 is aligned parallel to the X-axis direction, and the longitudinal direction of the strip patterns of the second electrodes E32, E42 is aligned parallel to the Y-axis direction. The alignment direction of the alignment film is set in the present embodiment at 90 degrees to the direction of extension of the electrode with a strip pattern according to the definition of the X-axis and Y-axis directions, although the direction of 90±10 degrees can also be set.

In the following explanation, the same direction as the polarization direction of the first polarized component PL1 is the Y-axis direction, and the same direction as the polarization direction of the second polarized component PL2 is the X-axis direction. The (diffuse light 1X) shown in the table in FIG. 10 indicates that the polarized component was diffused 1 time in the X-axis direction before reaching the position in question, and (diffuse light 1X1Y) indicates that the polarized component was diffused 1 time in the X-axis direction and also 1 time in the Y-axis direction before reaching the position in question.

FIG. 10 shows the electrodes generating the transverse electric field by hatching. Tables are inserted in FIG. 10 to show the state of each polarized component when light containing the first polarized component PL1 and the second polarized component PL2 passes through the first electrode, the liquid crystal layer, and the second electrode of each liquid crystal cell, using the terms transmission, optical rotation, and diffusion. The term "transmission" indicates that the polarized component passes through as it is without being diffused or rotated. The term "optical rotation" indicates that the polarized component has transitioned 90 degrees in its direction of polarization. The term "diffusion" indicates that the polarized component is diffused under the influence of the refractive index distribution of the liquid crystal molecules. Therefore, for example, the term "transmission" at the first electrode, in the table indicates that the above "transmission" phenomenon occurs in the vicinity of the first electrode of the liquid crystal layer. The term "optical rotation" in the liquid crystal layer indicates that the polarized component transitions in the direction of polarization by 90 degrees in the process of passing through the liquid crystal layer from the first substrate side to the second substrate side.

The liquid crystal light control element 102 is arranged with the first liquid crystal cell 10, the second liquid crystal cell 20, the third liquid crystal cell 30, and the fourth liquid crystal cell 40 in this order from the light input side. The light incident into the liquid crystal light control element 102 includes the first polarized component PL1 and the second polarized component PL2, which is orthogonal to the first polarized component PL1.

As shown in FIG. 10, the second electrode E12 of the first liquid crystal cell 10 and the second electrode E22 of the second liquid crystal cell 20 are arranged in the same longitudinal direction and can diffuse the first polarized component PL1 in the Y-axis direction. The second electrode E32 of the third liquid crystal cell 30 and the second electrode E42 of the fourth liquid crystal cell 40 are arranged in the same longitudinal direction and can diffuse the second polarized component PL2 in the X-axis direction.

Figure 11:
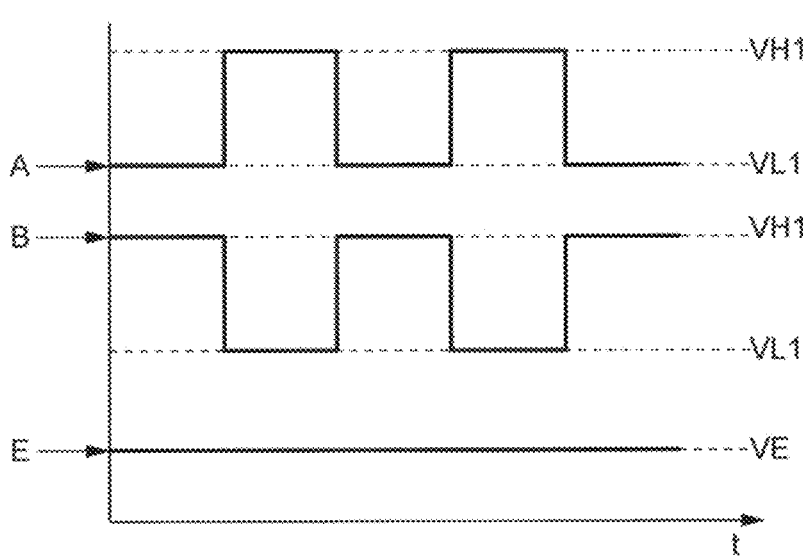
FIG. 11 is a diagram showing the signals that control the operation of the liquid crystal light control device according to an embodiment of the present invention.

To control the polarization and diffusion of the incident light by the liquid crystal light control element 102, the control signals are input to each liquid crystal cell. FIG. 11 shows an example of waveforms of control signals applied to the electrodes of each liquid crystal cell. One of the control signals shown in FIG. 11, that is, a control signal A, a control signal B, or a control signal E, is input to each liquid crystal cell. VL1 means the low-level voltage and VH1 means the high-level voltage in the control signals A and B. For example, the VL1 is a voltage of 0 V or –15 V, and the VH1 is 30 V (relative to 0 V) or 15 V (relative to –15 V). The control signals A and B are synchronous, when the control signal A is at the level of VL1, the control signal B is at the level of VH1, and when the control signal A changes to the level of VH1, the control signal B changes to the level of VL1. The period of the control signals A and B is about 15 to 100 Hz. The control signal E, on the other hand, is a constant voltage signal, for example, the control signal E is an intermediate voltage between VL1 and VH1, VE=15V when VL1=0V and VH1=30V, VE=0V when VL1=–15V and VH1=+15V.

The liquid crystal light control device 100 can control various light distribution patterns of light emitted from the light source unit (106) by selecting control signals to be applied to each liquid crystal cell of the liquid crystal light control element 102. The present embodiment shows an example of controlling the light emitted from the light source unit (106) by the liquid crystal light control element 102 to a square-shaped light distribution pattern.

Table 1 shows the control signals applied to each liquid crystal cell of the liquid crystal light control element 102 shown in FIG. 10. The control signals A, B, and E shown in Table 1 correspond to the control signals shown in FIG. 11.

TABLE 1

| Liquid Crystal Light Control Element: 102 | | | | Control Signal |
|---|---|---|---|---|
| Fourth | Second | 2nd Electrode | 4th strip electrode: E42B | B |
| Liquid | Substrate | E42 | 3rd strip electrode: E42A | A |
| Crystal | First | 1st Electrode | 2nd strip electrode: E41B | E |
| Cell 40 | Substrate | E41 | 1st strip electrode: E41A | E |
| Third | Second | 2nd Electrode | 4th strip electrode: E32B | B |
| Liquid | Substrate | E32 | 3rd strip electrode: E32A | A |
| Crystal | First | 1st Electrode | 2nd strip electrode: E31B | E |
| Cell 30 | Substrate | E31 | 1st strip electrode: E31A | E |
| Second | Second | 2nd Electrode | 4th strip electrode: E22B | B |
| Liquid | Substrate | E22 | 3rd strip electrode: E22A | A |
| Crystal | First | 1st Electrode | 2nd strip electrode: E21B | E |
| Cell 20 | Substrate | E21 | 1st strip electrode: E21A | E |
| First | Second | 2nd Electrode | 4th strip electrode: E12B | B |
| Liquid | Substrate | E12 | 3rd strip electrode: E12A | A |
| Crystal | First | 1st Electrode | 2nd strip electrode: E11B | E |
| Cell 10 | Substrate | E11 | 1st strip electrode: E11A | E |

As shown in FIG. 10 and Table 1, the control signal is input to each liquid crystal cell of the liquid crystal light control element 102. The control signal E is input to the first strip electrode E11A and the second strip electrode E11B of the first liquid crystal cell 10, the control signal A is input to the third strip electrode E12A, and the control signal B is input to the fourth strip electrode E12B. As shown in Table 1, the control signals A, B, and E are input to the second liquid crystal cell 20, the third liquid crystal cell 30, and the fourth liquid crystal cell 40 as in the first liquid crystal cell 10. That is, the control signal E is applied to the first electrode of each liquid crystal cell, the control signals A and B are applied to the second electrode of each liquid crystal cell, in the liquid crystal light control element 102 shown in FIG. 10, and the transverse electric field is generated only on the second substrate side.

When the liquid crystal light control element 102 is in operation, the control signals shown in Table 1 are input to each strip electrode of each liquid crystal cell. When the control signals shown in Table 1 are input to the first liquid crystal cell 10, the second liquid crystal cell 20, the third liquid crystal cell 30, and the fourth liquid crystal cell 40, the liquid crystal molecules closer to the second substrate of each liquid crystal cell are affected by the transverse electric field and their alignment state changes as shown in FIG. 7C.

Focusing on the first polarized component PL1 in FIG. 10, the direction of the polarization axis of the first polarized component PL1 incident on the first liquid crystal cell 10 is in the direction that intersects (orthogonally) the long axis direction of the liquid crystal molecules closer to the first substrate S11 of the first liquid crystal layer LC1. Since the first electrode E11 does not generate a transverse electric field, the first polarized component PL1 is not diffused and simply passes toward to the second substrate S12. The first polarized component PL1 is optically rotated 90 degrees according to the twisting alignment of the liquid crystal molecules in the process of passing through the first liquid crystal layer LC1 from the first substrate S11 side to the second substrate S12 side. As a result, the first polarized component PL1 transitions to the second polarized component PL2. While on the second substrate S12 side, the second electrode E12 generates a transverse electric field, the direction of the polarization axis of the second polarized component PL2 is in the direction that intersects the long axis direction of the liquid crystal molecules closer to the second substrate S12. Therefore, although the liquid crystal molecules closer to the second substrate S12 have their refractive index distribution changed by the electric field generated by the second electrode E12, the second polarized component PL2 is not affected and passes through without being affected. That is, the first polarized component PL1 transitions to the second polarized component PL2 in the process of passing through the first liquid crystal cell 10, and is emitted from the second substrate S12 side without being diffused.

The second polarized component PL2 emitted from the first liquid crystal cell 10 enters the second liquid crystal cell 20. The second polarized component PL2 has the direction of the polarization axis parallel to the long axis direction of the liquid crystal molecules closer to the first substrate S21 of the second liquid crystal layer LC2. Since the first electrode E21 does not generate a transverse electric field, the second polarized component PL2 is not diffused and simply passes toward to the second substrate S22 side. The second polarized component PL2 is optically rotated 90 degrees according to the twisting alignment of the liquid crystal molecules in the process of passing through the second liquid crystal layer LC2 from the first substrate S21 side to the second substrate S22 side. As a result, the second polarized component PL2 transitions to the first polarized component PL1. The polarization axis of the first polarized component PL1 is in the direction parallel to the long axis direction of the liquid crystal molecules closer to the second substrate S22. Since the liquid crystal molecules closer to the second substrate S22 have their refractive index distribution changed by the transverse electric field generated by the second electrode E22, the first polarized component PL1 is diffused in the Y-axis direction and then emitted from the second liquid crystal cell 20. That is, the second polarized component PL2 incident on the second liquid crystal cell 20 transitions to the first polarized component PL1 in the process of passing through the second liquid crystal cell 20 and diffuses in the Y-axis direction.

As described above, the first polarized component PL1 of the incident light enters the first liquid crystal cell 10 and transitions once to the second polarized component PL2 before being emitted from the second liquid crystal cell 20, and then transitions again to the first polarized component PL1, and is diffused once in the Y-axis direction in the second liquid crystal cell 20.

In the third liquid crystal cell 30, the longitudinal direction of the first electrode E31 intersects the first electrode E11 of the first liquid crystal cell 10 and the first electrode E21 of the second liquid crystal cell 20 at an angle of 90 degrees, and the longitudinal direction of the second electrode E32 intersects the second electrode E12 of the first liquid crystal cell 10 and the second electrode E22 of the second liquid crystal cell 20 at an angle of 90 degrees. The same applies to the fourth liquid crystal cell 40. The longitudinal direction of the first electrode E41 intersects the first electrode E11 of the first liquid crystal cell 10 and the first electrode E21 of the second liquid crystal cell 20 at an angle of 90 degrees, and the longitudinal direction of the second electrode E42 intersects the second electrode E12 of the first liquid crystal cell 10 and the second electrode E22 of the second liquid crystal cell 20 at an angle of 90 degrees. Therefore, in these third liquid crystal cell and the fourth liquid crystal cell, for each polarized component, the phenomena occurring in the first liquid crystal cell 10 and the second liquid crystal cell 20 are reversed. The crossing angle can be set in the range of 90±10 degrees.

When the first polarized component PL1 (diffused light 1Y), which has passed through the second liquid crystal cell 20 and diffused once in the Y-axis direction, enters the third liquid crystal cell 30, the first polarized component PL1 (diffused light 1Y) is in the direction of the polarization axis parallel to the long axis direction of the liquid crystal molecules closer to the first substrate S31 of the third liquid crystal layer LC3. Since the first electrode E31 does not generate a transverse electric field, the first polarized component PL1 (diffuse light 1Y) incident on the third liquid crystal cell 30 is not diffused, and is optically rotated 90 degrees according to the twisting alignment of the liquid crystal molecules in the process of passing through the third liquid crystal layer LC3 from the first substrate S31 side to the second substrate S32 side. As a result, the first polarized component PL1 (diffuse light 1Y) transitions to the second polarized component PL2 (diffuse light 1Y). The polarization axis of the second polarized component PL2 (diffuse light 1Y) is in the direction parallel to the long axis direction of the liquid crystal molecules closer to the second substrate S32. Since the liquid crystal molecules closer to the second substrate S32 have their refractive index distribution changed by the transverse electric field generated by the second electrode E32, the second polarized component PL2 (diffused light 1Y) is diffused in the X-axis direction and then emitted from the third liquid crystal cell 30. That is, the first polarized component PL1 (diffused light 1Y) incident on the third liquid crystal cell 30 transitions to the second polarized component PL2 and diffuses in the X-axis direction (diffused light 1X1Y) in the process of passing through the third liquid crystal cell 30.

The direction of the polarization axis of the second polarized component PL2 (diffused light 1X1Y) emitted from the third liquid crystal cell 30 and incident on the fourth liquid crystal cell 40 is in the direction that intersects the long axis direction of the liquid crystal molecules closer to the first substrate S41 of the fourth liquid crystal layer LC4. Since the first electrode E41 does not generate a transverse electric field, the second polarized component PL2 (diffuse light 1X1Y) incident on the fourth liquid crystal cell 40 is not diffused and is optically rotated 90 degrees according to the twisting alignment of the liquid crystal molecules in the process of passing through the fourth liquid crystal layer LC4 from the first substrate S41 side to the second substrate S42 side. As a result, the second polarized component PL2 (diffuse light 1X1Y) transitions to the first polarized component PL1 (diffuse light 1X1Y). The direction of the polarization axis of the first polarized component PL1 (diffuse light 1X1Y) is in the direction that intersects the long axis direction of the liquid crystal molecules closer to the second substrate S42. Since the liquid crystal molecules closer to the second substrate S42 have their refractive index distribution changed by the transverse electric field generated by the second electrode E42, the first polarized component PL1 (diffuse light 1X1Y) is not affected and passes through without being affected. That is, the second polarized component PL2 (diffuse light 1X1Y) transitions to the first polarized component PL1 (diffuse light 1X1Y) in the process of passing through the fourth liquid crystal cell 40, while it is emitted from the fourth cell without being diffused.

As described above, the first polarized component PL1 (diffused light 1Y) incident on the third liquid crystal cell 30 is optically rotated by 90 degrees in the third liquid crystal layer LC3 and the fourth liquid crystal layer LC4, respectively, and diffused in the X-axis direction by the third liquid crystal cell 30 before it is emitted from the fourth liquid crystal cell 40, and is emitted from the fourth liquid crystal cell 40 as the first polarized component PL1 (diffused light 1X1Y).

Therefore, the first polarized component PL1 emitted from the light source is optically rotated four times with the polarization axis at an angle of 90 degrees and diffused once in the X-axis direction and once in the Y-axis direction between the time it enters the first liquid crystal cell 10 and is emitted from the fourth liquid crystal cell 40.

On the other hand, the second polarized component PL2 incident on the first liquid crystal cell 10 has its polarization axis direction parallel to the long axis direction of the liquid crystal molecules closer to the first substrate S11 of the first liquid crystal layer LC1. Since the first electrode E11 does not generate a transverse electric field, the second polarized component PL2 is not diffused and simply passes toward to the second substrate S12. The second polarized component PL2 is optically rotated 90 degrees according to the twisting alignment of the liquid crystal molecules in the process of passing through the first liquid crystal layer LC1 from the first substrate S11 side to the second substrate S12 side. As a result, the second polarized component PL2 transitions to the first polarized component PL1. The direction of the polarization axis of the first polarized component PL1 is parallel to the long axis direction of the liquid crystal molecules closer to the second substrate S12. Since the liquid crystal molecules closer to the second substrate S12 have their refractive index distribution changed by the electric field generated by the second electrode E12, the first polarized component PL1 transitioned by the first liquid crystal layer LC1 is diffused in the Y-axis direction by the refractive index distribution formed by the liquid crystal molecules closer to the second substrate S12. That is, the second polarized component PL2 incident on the first liquid crystal cell 10 transitions to the first polarized component PL1 in the process of passing through the first liquid crystal cell 10 and diffuses in the Y-axis direction (diffuse light 1Y).

The first polarized component PL1 (diffuse light 1Y) emitted from the first liquid crystal cell 10 enters the second liquid crystal cell 20. The direction of the polarization axis of the first polarized component PL1 (diffuse light 1Y) incident on the second liquid crystal cell 20 is in the direction that intersects (orthogonal to) the long axis direction of the liquid crystal molecules closer to the first substrate S21 of the second liquid crystal layer LC2. Since the first electrode E21 does not generate a transverse electric field, the first polarized component PL1 (diffused light 1Y) is not diffused and simply passes toward to the second substrate S22. The first polarized component PL1 (diffuse light 1Y) is optically rotated 90 degrees according to the twisting alignment of the liquid crystal molecules in the process of passing through the second liquid crystal layer LC2 from the first substrate S21 side to the second substrate S22 side. As a result, the first polarized component PL1 (diffuse light 1Y) transitions to the second polarized component PL2 (diffuse light 1Y). The direction of the polarization axis of the second polarized component PL2 is in the direction that intersects the long axis direction of the liquid crystal molecules closer to the second substrate S22. Although the liquid crystal molecules closer to the second substrate S22 change the refractive index distribution by the electric field generated by the second electrode E22, the second polarized component PL2 is not affected and passes through without being affected. That is, the first polarized component PL1 (diffuse light 1Y) incident on the second liquid crystal cell 20 transitions to the second polarized component PL2 (diffuse light 1Y) in the process of passing through the second liquid crystal cell 20, and is passing through without being diffused.

As described above, the second polarized component PL2 of the incident light is once transitioned to the first polarized component PL1 and then to the second polarized component PL2 again before it enters the first liquid crystal cell 10 and is emitted from the second liquid crystal cell 20, and is diffused once in the Y-axis direction by the first liquid crystal cell 10.

The second polarized component PL2 (diffused light 1Y), which is optically rotated 90 degrees in the first liquid crystal cell 10 and the second liquid crystal cell 20, respectively, and diffused once in the Y-axis direction in the first liquid crystal cell 10, is incident on the third liquid crystal cell 30. The polarization direction of the second polarized component PL2 (diffused light 1Y) incident on the third liquid crystal cell 30 is in the direction intersecting (orthogonal) the long axis direction of the liquid crystal molecules closer to the first substrate S31 of the third liquid crystal layer LC3. Since the first electrode E31 does not generate a transverse electric field, the second polarized component PL2 (diffuse light 1Y) incident on the third liquid crystal cell 30 is not diffused and is optically rotated 90 degrees according to the twisting alignment of the liquid crystal molecules in the process of passing through the third liquid crystal layer LC3 from the first substrate S31 side to the second substrate S32 side. As a result, the second polarized component PL2 (diffuse light 1Y) transitions to the first polarized component PL1 (diffuse light 1Y). The polarization direction of the first polarized component PL1 (diffuse light 1Y) is in the direction that intersects the long axis direction of the liquid crystal molecules closer to the second substrate S32. Since the liquid crystal molecules closer to the second substrate S32 have their refractive index distribution changed by the electric field generated by the second electrode E32, the first polarized component PL1 (diffuse light 1Y) is not affected and passes through without being affected. That is, the second polarized component PL2 (diffuse light 1Y) incident on the third liquid crystal cell 30 transitions to the first polarized component PL1 (diffuse light 1Y) in the process of passing through the third liquid crystal cell 30, and is passing through without being diffused.

When the first polarized component PL1 (diffused light 1Y), which passes through the third liquid crystal cell 30, and is diffused once in the Y-axis direction, and is optically rotated by 90 degrees in the first liquid crystal cell 10, the second liquid crystal cell 20 and the third liquid crystal cell 30 respectively, enters the fourth liquid crystal cell 40, the polarization direction of the first polarized component PL1 (diffuse light 1Y) is parallel to the long axis direction of the liquid crystal molecules closer to the first substrate S41 of the fourth liquid crystal layer LC4. Since the first electrode E41 does not generate a transverse electric field, the first polarized component PL1 (diffuse light 1Y) incident on the fourth liquid crystal cell 40 is not diffused and is optically rotated 90 degrees according to the twisting alignment of the liquid crystal molecules in the process of passing through the fourth liquid crystal layer LC4 from the first substrate S41 side to the second substrate S42 side. As a result, the first polarized component PL1 (diffuse light 1Y) transitions again to the second polarized component PL2 (diffuse light 1Y). The polarization direction of the second polarized component PL2 (diffuse light 1Y) is parallel to the long axis direction of the liquid crystal molecules closer to the second substrate S42. Since the liquid crystal molecules closer to the second substrate S42 have their refractive index distribution changed by the transverse electric field generated by the second electrode E42, the second polarized component PL2 (diffused light 1Y) is diffused in the X-axis direction under the influence of the refractive index distribution of the liquid crystal molecules and is emitted from the fourth liquid crystal cell 40 as the second polarized component (diffused light 1X1Y).

As described above, the second polarized component PL2 (diffuse light 1Y) incident on the third liquid crystal cell 30 transitions once to the first polarized component PL1 (diffuse light 1Y) and then again to the second polarized component PL2 (diffuse light 1Y) before being emitted from the fourth liquid crystal cell 40, and is diffused once in the X-axis direction in the fourth liquid crystal cell 40 and is emitted as the second polarized component PL2 (diffuse light 1X1Y).

Therefore, the second polarized component PL2 emitted from the light source is optically rotated four times with the polarization axis at an angle of 90 degrees and diffused once in the X-axis direction and once in the Y-axis direction before it enters the first liquid crystal cell 10 and is emitted from the fourth liquid crystal cell 40.

According to the operation of the liquid crystal light control element 102 shown in FIG. 10, the first polarized component PL1 of the light emitted from the light source unit 106 is diffused once in the X-axis direction and once in the Y-axis direction, and the second polarized component PL2 is diffused once in the X-axis direction and once in the Y-axis direction, thereby forming a square-shaped light distribution pattern. Since both the first polarized component PL1 and the second polarized component PL2 are diffused in the X-axis direction and the Y-axis direction after being rotated in the liquid crystal layer, it is possible to reduce the loss of light at the time of optical rotation. In other words, it is possible to eliminate optical rotation while diffusing, thereby reducing the loss of light during optical rotation, by not diffusing the first polarized component PL1 and the second polarized component PL2 before optical rotation. As a result, when the light distribution pattern of the light source is controlled by the liquid crystal light control element 102, it is possible to suppress disturbances in the shape of the light distribution pattern.

It is possible to prevent color breaking by diffusing one polarized component in the X-axis direction and the Y-axis direction at electrodes arranged in different liquid crystal cells and on the opposite side of the light input side across the liquid crystal layer, respectively.

Figure 12:
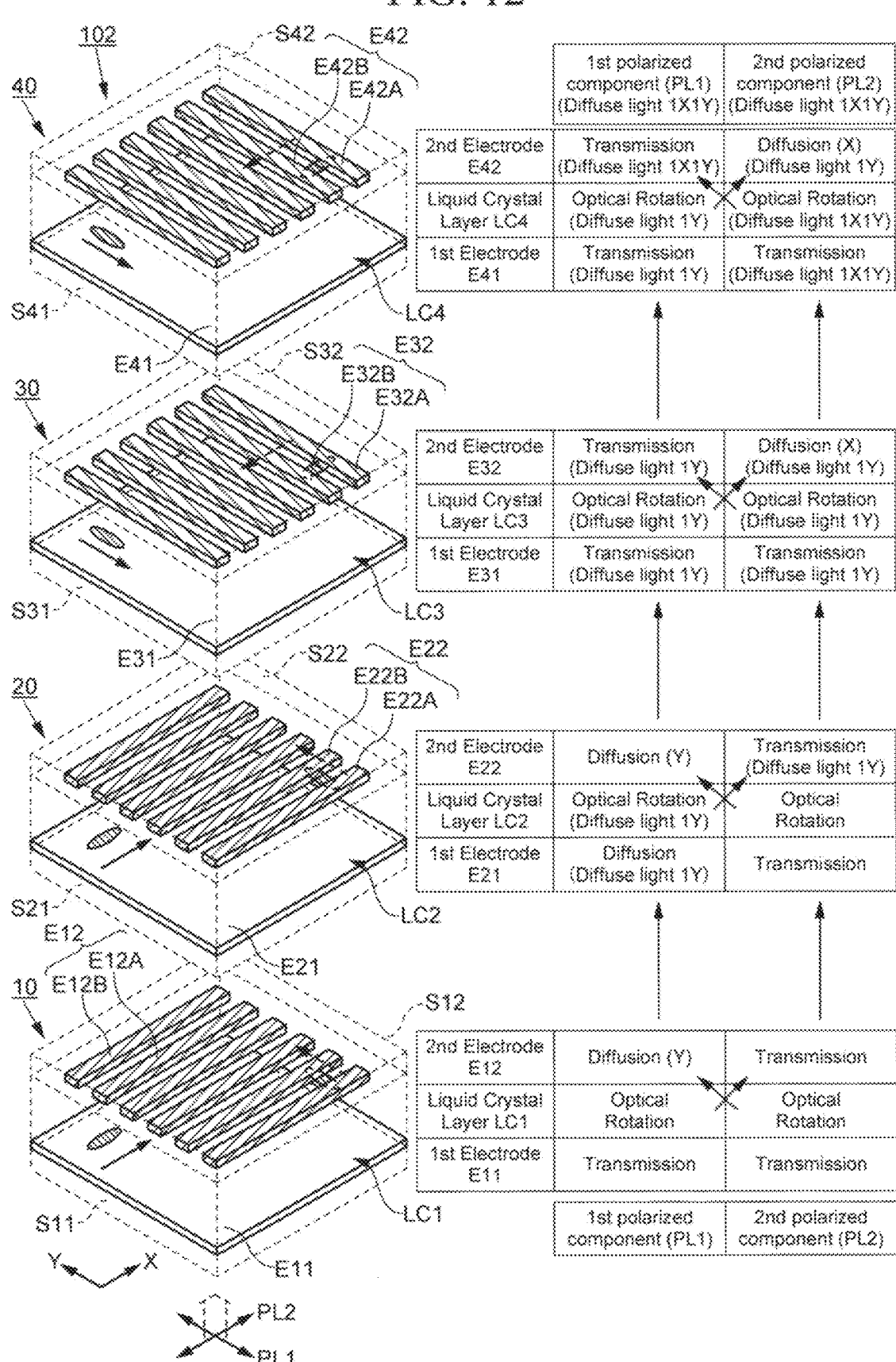
FIG. 12 is a diagram illustrating an operation of a liquid crystal light control device according to an embodiment of the present invention.

Since the mode of operation of the 102 liquid crystal light control device shown in FIG. 10 is not to generate a transverse electric field at the first electrode of each liquid crystal cell, a square-shaped light distribution pattern can be formed in the same way by the liquid crystal light control device in the configurations shown in FIG. 9 and FIG. 12. FIG. 9 and FIG. 12 show an example in which the first electrode of each liquid crystal cell is formed by a flat plate electrode (solid electrode). In FIG. 9 and FIG. 12, the alignment direction of the liquid crystal molecules of each liquid crystal cell, the disposed second electrodes (E12, E22, E32, E42), and the control signals applied to the second electrodes are the same as in the example shown in FIG. 10 (refer to FIG. 12).

As shown in the table inserted in FIG. 12, the transitions of the first polarized component PL1 and the second polarized component PL2 passing through the first liquid crystal cell 10, the second liquid crystal cell 20, the third liquid crystal cell 30, and the fourth liquid crystal cell 40 are identical to the embodiment shown in FIG. 10, and detailed descriptions are omitted. Even if the first electrode is replaced with the flat plate electrode (solid electrode) as shown in FIG. 12, the first polarized component PL1 of light emitted from the light source unit (106) can be diffused once in the X-axis direction and once in the Y-axis direction and the second polarized component PL2 once in the X-axis direction and once in the Y-axis direction so that a square-shaped light distribution pattern can be formed.

Second Embodiment

Figure 13:
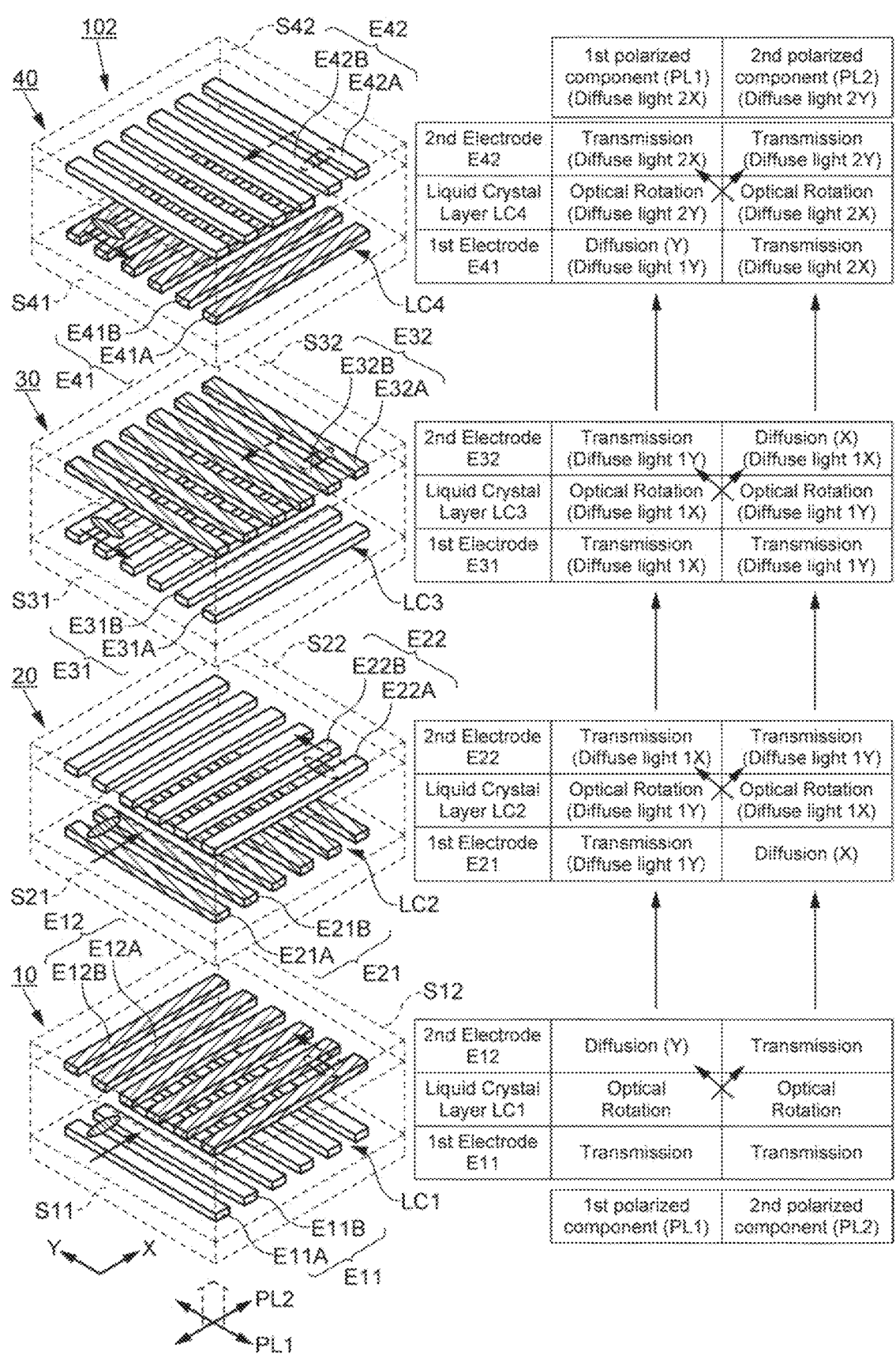
FIG. 13 is a diagram illustrating an operation of a liquid crystal light control device according to an embodiment of the present invention.

This embodiment shows an example of the configuration and operation of the liquid crystal light control element 102, which can distribute light emitted from a light source in a cross-shaped pattern. FIG. 13 shows an arrangement of strip electrodes in each liquid crystal cell of the liquid crystal light control element 102 of the present embodiment and the mode in which the polarization state and diffusion of incident light is controlled by each liquid crystal cell. The arrangement of the strip electrodes in the first liquid crystal cell 10, the second liquid crystal cell 20, the third liquid crystal cell 30, and the fourth liquid crystal cell 40 shown in FIG. 13 is the same as in the first embodiment.

Table 2 shows the control signals applied to each liquid crystal cell in the liquid crystal light control element 102 shown in FIG. 13. The control signals A, B, and E shown in Table 2 correspond to the control signals shown in FIG. 11.

TABLE 2

| Liquid Crystal Light Control Element: 102 | | | | Control Signal |
|---|---|---|---|---|
| Fourth | Second | 2nd Electrode | 4th strip electrode: E42B | E |
| Liquid | Substrate | E42 | 3rd strip electrode: E42A | E |
| Crystal | First | 1st Electrode | 2nd strip electrode: E41B | B |
| Cell 40 | Substrate | E41 | 1st strip electrode: E41A | A |
| Third | Second | 2nd Electrode | 4th strip electrode: E32B | B |
| Liquid | Substrate | E32 | 3rd strip electrode: E32A | A |
| Crystal | First | 1st Electrode | 2nd strip electrode: E31B | E |
| Cell 30 | Substrate | E31 | 1st strip electrode: E31A | E |
| Second | Second | 2nd Electrode | 4th strip electrode: E22B | E |
| Liquid | Substrate | E22 | 3rd strip electrode: E22A | E |
| Crystal | First | 1st Electrode | 2nd strip electrode: E21B | B |

TABLE 2-continued

| Liquid Crystal Light Control Element: 102 | | | | Control Signal |
|---|---|---|---|---|
| Cell 20 | Substrate | E21 | 1st strip electrode: E21A | A |
| First | Second | 2nd Electrode | 4th strip electrode: E12B | B |
| Liquid | Substrate | E12 | 3rd strip electrode: E12A | A |
| Crystal | First | 1st Electrode | 2nd strip electrode: E11B | E |
| Cell 10 | Substrate | E11 | 1st strip electrode: E11A | E |

As shown in FIG. 13 and Table 2, the control signals are input to each of the liquid crystal cells of the liquid crystal light control element 102. The control signal E is input to the first strip electrode E11A and the second strip electrode E11B of the first liquid crystal cell 10, the control signal A is input to the third strip electrode E12A, and the control signal B is input to the fourth strip electrode E12B. As shown in Table 2, the control signal is input to the third liquid crystal cell 30 in the same way as in the first liquid crystal cell 10. However, the orientation of the longitudinal direction of the strip electrode, the alignment direction of the alignment film, and the alignment of the long axis direction of the liquid crystal molecules are different in the third liquid crystal cell 30 compared to the first liquid crystal cell 10. The control signal A is input to the first strip electrode E21A of the second liquid crystal cell 20, the control signal B is input to the second strip electrode E21B, and the control signal E is input to the third strip electrode E22A and the fourth strip electrode E22B. As shown in Table 2, the control signal is input to the fourth liquid crystal cell 40 in the same way as to the second liquid crystal cell 20. However, the fourth liquid crystal cell 40 differs from the first liquid crystal cell 10 in the orientation of the longitudinal direction of the strip electrodes, the alignment direction of the alignment film, and the long-axis direction of the liquid crystal molecules. Thus, the liquid crystal light control element 102 shown in FIG. 13 has a configuration in which the transverse electric field is generated on the second substrate S12, S32 sides in the first liquid crystal cell 10 and the third liquid crystal cell 30, and on the first substrate S21, S41 sides in the second liquid crystal cell 20 and the fourth liquid crystal cell 40.

When the liquid crystal light control element 102 is in operation, the control signals shown in Table 2 are input to each strip electrode of each liquid crystal cell. When the control signals shown in Table 2 are input to each liquid crystal cell, the transverse electric field is generated on the second substrate S12, S32 sides in the first liquid crystal cell 10 and the third liquid crystal cell 30, and on the first substrate S21, S41 sides in the second liquid crystal cell 20 and the fourth liquid crystal cell 40, and the liquid crystal molecules are affected by the transverse electric field and their alignment state changes.

Focusing on the first polarized component PL1 in FIG. 13, the first polarized component PL1 transitions to the second polarized component PL2 in the process of passing through the first liquid crystal cell 10 as in the first embodiment, and is emitted from the second substrate S12 side without being diffused.

The second polarized component PL2 emitted from the first liquid crystal cell 10 enters the second liquid crystal cell 20. The second polarized component PL2 is in the direction of the polarization axis parallel to the long axis direction of the liquid crystal molecules on the first substrate S21 side of the second liquid crystal layer LC2. Since the refractive index distribution of the liquid crystal molecules on the first substrate S21 side are changing by the transverse electric field generated by the first electrode E21, the second polarized component PL2 is diffused in the X-axis direction. The second polarized component PL2 is optically rotated 90 degrees according to the twisting alignment of the liquid crystal molecules in the process of passing through the second liquid crystal layer LC2 from the first substrate S21 side to the second substrate S22 side. As a result, the second polarized component PL2 (diffused light 1X) diffused in the X-axis direction transitions to the first polarized component PL1. Since the second electrode E22 is not generating a transverse electric field, the first polarized component PL1 (diffused light 1X) is not diffused and simply passes toward to the second substrate S22 and is emitted from the second liquid crystal cell 20. That is, the second polarized component PL2 incident on the second liquid crystal cell 20 is diffused in the X-axis direction in the process of passing through the second liquid crystal cell 20, transitions to the first polarized component PL1 (diffused light 1X), and is emitted.

As described above, the first polarized component PL1 of the incident light enters the first liquid crystal cell 10 and transitions once to the second polarized component PL2 and then again to the first polarized component PL1 before being emitted from the second liquid crystal cell 20.

As described in the first embodiment, the third liquid crystal cell 30 has the longitudinal direction of the first electrode E31 intersecting the first electrode E11 of the first liquid crystal cell 10 and the first electrode E21 of the second liquid crystal cell 20 at an angle of 90 degrees, and the longitudinal direction of the second electrode E32 intersecting the second electrode E12 of the first liquid crystal cell 10 and the second electrode E22 of the second liquid crystal cell 20 at an angle of 90 degrees intersects at an angle of 90 degrees. Similarly, the fourth liquid crystal cell 40 has the longitudinal direction of the first electrode E41 intersecting the first electrode E11 of the first liquid crystal cell 10 and the first electrode E21 of the second liquid crystal cell 20 at an angle of 90 degrees and the longitudinal direction of the second electrode E42 intersecting the second electrode E12 of the first liquid crystal cell 10 and the second electrode E22 of the second liquid crystal cell 20 at an angle of 90 degrees. Therefore, for each polarized component in the third liquid crystal cell and the fourth liquid crystal cell, the phenomena occurring in the first liquid crystal cell 10 and the second liquid crystal cell 20 are reversed. The crossing angle can be set in the range of 90±10 degrees.

When the first polarized component PL1 (diffused light 1X), which has passed through the second liquid crystal cell 20 and diffused once in the X-axis direction, enters the third liquid crystal cell 30, the direction of the polarization axis is parallel to the long axis direction of the liquid crystal molecules on the first substrate S31 side of the third liquid crystal layer LC3. Since the first electrode E31 does not generate a transverse electric field, the first polarized component PL1 (diffuse light 1X) incident on the third liquid crystal cell 30 is not diffused, and is optically rotated 90 degrees according to the twisting alignment of the liquid crystal molecules in the process of passing through the third liquid crystal layer LC3 from the first substrate S31 side to the second substrate S32 side. As a result, the first polarized component PL1 (diffuse light 1X) transitions to the second polarized component PL2 (diffuse light 1X). The polarization axis of the second polarized component PL2 (diffuse light 1X) is in the direction parallel to the long axis direction of the liquid crystal molecules on the second substrate S32 side. Since the refractive index distribution of the liquid crystal molecules on the second substrate S32 side are changing by the transverse electric field generated by the second electrode E32, the second polarized component PL2 (diffuse light 1X) is diffused in the X-axis direction and then emitted from the third liquid crystal cell 30. That is, the first polarized component PL1 (diffused light 1X) incident on the third liquid crystal cell 30 transitions to the second polarized component PL2 (diffused light 1X) in the process of passing through the third liquid crystal cell 30 and is further diffused in the X-axis direction.

The first electrode E41 generates the transverse electric field in the fourth liquid crystal cell 40, and the refractive index distribution of the liquid crystal molecules on the first substrate S41 side changes due to the transverse electric field generated by the first electrode E41. Since the direction of the polarization axis of the second polarized component PL2 (diffused light 2X) incident on the fourth liquid crystal cell 40 is in the direction that intersects the long axis direction of the liquid crystal molecules on the first substrate S41 side of the fourth liquid crystal layer LC4, the light is not diffused, and the second polarized component PL2 (diffused light 2X) is optically rotated 90 degrees according to the twisting alignment of the liquid crystal molecules in the process of passing through the fourth liquid crystal layer LC4 from the first substrate S41 side to the second substrate S42 side. As a result, the second polarized component PL2 (diffused light 2X) transitions to the first polarized component PL1 (diffused light 2X). Since the second electrode E42 does not generate a transverse electric field, the first polarized component PL1 (diffused light 2X) is not diffused and passes through the second substrate S42 and is emitted from the fourth liquid crystal cell 40. That is, the second polarized component PL2 (diffused light 2X) incident on the fourth liquid crystal cell 40 is not diffused in the process of passing through the fourth liquid crystal cell 40, and transitions to the first polarized component PL1 (diffused light 2X) and is emitted.

As described above, the first polarized component PL1 (diffused light 1X) incident on the third liquid crystal cell 30 is optically rotated by 90 degrees in the third liquid crystal layer LC3 and the fourth liquid crystal layer LC4, respectively, and diffused in the X-axis direction by the third liquid crystal cell 30, before being emitted from the fourth liquid crystal cell 40 as the first polarized component PL1 (diffused light 2X).

Therefore, the first polarized component PL1 emitted from the light source is optically rotated four times with the polarization axis at an angle of 90 degrees and diffused twice in the X-axis direction between the time it enters the first liquid crystal cell 10 and is emitted from the fourth liquid crystal cell 40.

Next, focusing on the second polarized component PL2 in FIG. 13, the second polarized component PL2 transitions to the first polarized component PL1 in the process of passing through the first liquid crystal cell 10 as in the first embodiment, and is diffused in the Y-axis direction on the second substrate S12 side and is emitted from the second substrate S12 side.

The first electrode E21 of the second liquid crystal cell 20 generates the transverse electric field, and the refractive index distribution of the liquid crystal molecules on the first substrate S21 side changes due to the transverse electric field generated by the first electrode E21. The direction of the polarization axis of the first polarized component PL1 (diffused light 1Y) incident on the second liquid crystal cell 20 is in the direction that intersects (orthogonal to) the long axis direction of the liquid crystal molecules on the first substrate S21 side of the second liquid crystal layer LC2, so it is not diffused, and is optically rotated 90 degrees according to the twisting alignment of the liquid crystal molecules in the process of passing through the second liquid crystal layer LC2 from the first substrate S21 side to the second substrate S22 side. As a result, the first polarized component PL1 (diffused light 1Y) transitions to the second polarized component PL2 (diffused light 1Y). Since the second electrode E22 does not generate a transverse electric field, the second polarized component PL2 (diffused light 1Y) is not diffused and simply passes toward to the second substrate S22 and is emitted from the second liquid crystal cell 20. That is, the first polarized component PL1 (diffuse light 1Y) incident on the second liquid crystal cell 20 is not diffused in the process of passing through the second liquid crystal cell 20, and is transitioned to the second polarized component PL2 (diffuse light 1Y) and is emitted.

As described above, the second polarization component PL2 in the incident light transits once to the first polarization component PL1 and diffuses once in the Y-axis direction until it enters the first liquid crystal cell 10 and exits the second liquid crystal cell 20, and then transits again to the second polarization component PL2 (diffused light 1Y) in the second liquid crystal cell 20.

The second polarized component PL2 (diffused light 1Y), which is optically rotated 90 degrees in the first liquid crystal cell 10 and the second liquid crystal cell 20, respectively, and diffused once in the Y-axis direction in the first liquid crystal cell 10, is incident on the third liquid crystal cell 30. The polarization direction of the second polarized component PL2 (diffused light 1Y) incident on the third liquid crystal cell 30 is in the direction that intersects (orthogonal to) the long axis direction of the liquid crystal molecules on the first substrate S31 side of the third liquid crystal layer LC3. Since the first electrode E31 does not generate a transverse electric field, the second polarized component PL2 (diffuse light 1Y) incident on the third liquid crystal cell 30 is not diffused and is optically rotated 90 degrees according to the twisting alignment of the liquid crystal molecules in the process of passing through the third liquid crystal layer LC3 from the first substrate S31 side to the second substrate S32 side. As a result, the second polarized component PL2 (diffuse light 1Y) transitions to the first polarized component PL1 (diffuse light 1Y). The polarization direction of the first polarized component PL1 (diffuse light 1Y) is in the direction that intersects the long axis direction of the liquid crystal molecules on the second substrate S32 side. Therefore, although the refractive index distribution of the liquid crystal molecules on the second substrate S32 side change due to the electric field generated by the second electrode E32, the first polarized component PL1 (diffuse light 1Y) is not affected and passes through directly. That is, the second polarized component PL2 (diffuse light 1Y) incident on the third liquid crystal cell 30 transitions to the first polarized component PL1 (diffuse light 1Y) in the process of passing through the third liquid crystal cell 30, and is transmitted without being diffused.

When the first polarized component PL1 (diffused light 1Y), which passes through the third liquid crystal cell 30, diffused once in the Y-axis direction and optically rotated 90 degrees by the first liquid crystal cell 10, the second liquid crystal cell 20, and the third liquid crystal cell 30, respectively, and enters the fourth liquid crystal cell 40, the first polarized component PL1 (diffuse light 1Y) is in the polarization direction parallel to the long axis direction of the liquid crystal molecules on the first substrate S41 side of the fourth liquid crystal layer LC4. The refractive index distribution of the liquid crystal molecules on the first substrate S41 side change due to the transverse electric field generated by the first electrode E41, so the first polarized component PL1 (diffused light 1Y) is diffused in the Y-axis direction. The first polarized component PL1 (diffused light 1Y) is optically rotated 90 degrees according to the twisting alignment of the liquid crystal molecules in the process of passing through the fourth liquid crystal layer LC4 from the first substrate S41 side to the second substrate S42 side. As a result, the first polarized component PL1 (diffused light 2Y) which is diffused in the Y-axis direction transitions to the second polarized component PL2 (diffused light 2Y) and is emitted from the fourth liquid crystal cell 40.

As described above, the second polarized component PL2 (diffuse light 1Y) incident on the third liquid crystal cell 30 transitions once to the first polarized component PL1 (diffuse light 1Y) before being emitted from the fourth liquid crystal cell 40, is diffused once in the Y-axis direction by the fourth liquid crystal cell 40, transitions again to the second polarized component PL2 (diffuse light 2Y) and is emitted.

Therefore, the second polarized component PL2 emitted from the light source is optically rotated four times with its polarization axis at an angle of 90 degrees and diffused twice in the Y-axis direction between the time it enters the first liquid crystal cell 10 and is emitted from the fourth liquid crystal cell 40.

According to the liquid crystal light control element 102 shown in FIG. 13, the first polarized component PL1 of the light emitted from the light source unit 106 is diffused twice in the X-axis direction and the second polarized component PL2 is diffused twice in the Y-axis direction, forming a cross-shaped light distribution pattern. The second polarized component PL2 of the two polarized components is diffused in the Y-axis direction after being optically rotated in the liquid crystal layer, thus reducing the loss of light during the optical rotation. In other words, by not diffusing the second polarized component PL2 before it is optically rotated, the light loss during optical rotation can be reduced because the optical rotation while diffusing can be eliminated. As a result, it is possible to reduce the disturbance of the shape of the light distribution pattern when the light distribution pattern of the light source is controlled by the liquid crystal light control element 102.

According to the liquid crystal light control element 102 in the configuration shown in FIG. 13, it is possible to prevent color breaking by diffusing one polarized component in the X-axis direction or the Y-axis direction by means of electrodes arranged in different liquid crystal cells and on the opposite side of the light input side across the liquid crystal layer.

Third Embodiment

Figure 14:
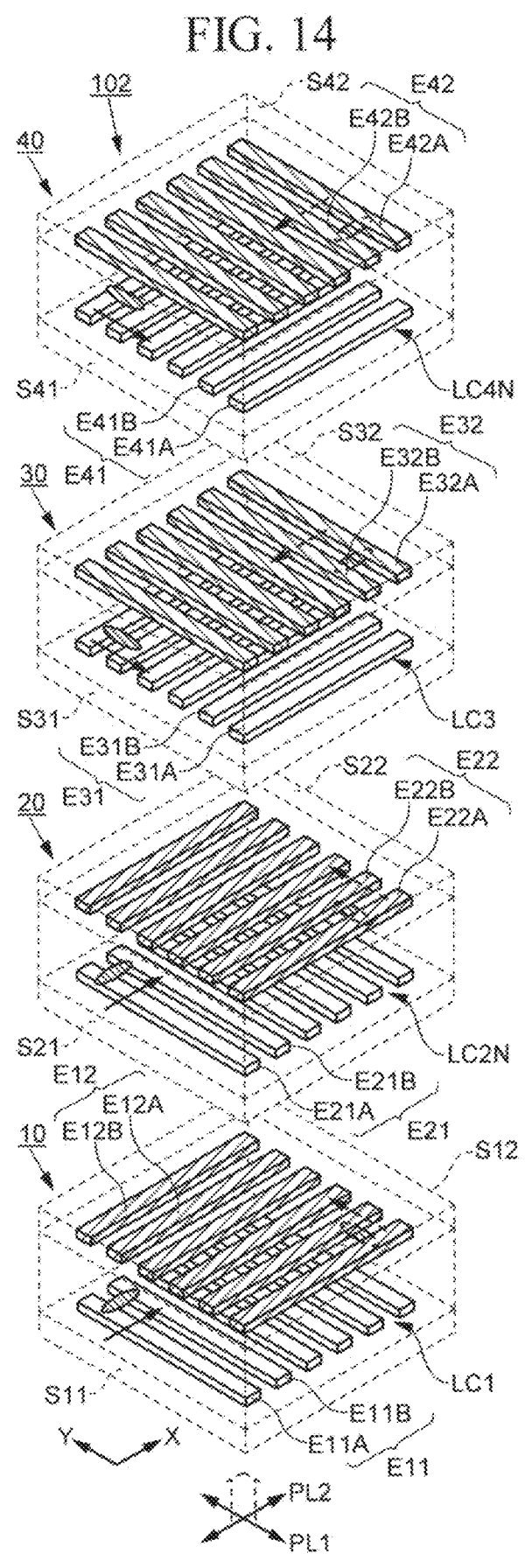

This embodiment shows a third configuration of the liquid crystal light control element 102. FIG. 14 shows an arrangement of strip electrodes in each liquid crystal cell of the liquid crystal light control element 102 of this embodiment. The arrangement of the strip electrodes in the first liquid crystal cell 10, the second liquid crystal cell 20, the third liquid crystal cell 30, and the fourth liquid crystal cell 40 shown in FIG. 14 is the same as in the first embodiment, but the difference is that negative liquid crystals are used for a second liquid crystal layer LC2N in the second liquid crystal cell 20 and a fourth liquid crystal layer LC4N in the fourth liquid crystal cell 40.

The light distribution pattern of light emitted from the light source can also be controlled by using negative liquid crystal in at least one of the plurality of liquid crystal cells and positive liquid crystal in the other liquid crystal cells. In the present embodiment, the first electrode E11 of the first liquid crystal cell 10, the first electrode E21 of the second liquid crystal cell 20, the first electrode E31 of the third liquid crystal cell 30, and the first electrode E41 of the fourth liquid crystal cell 40 can be replaced with the flat plate electrode (solid electrode) shown in FIG. 12 in the first embodiment.

Fourth Embodiment

Figure 15:
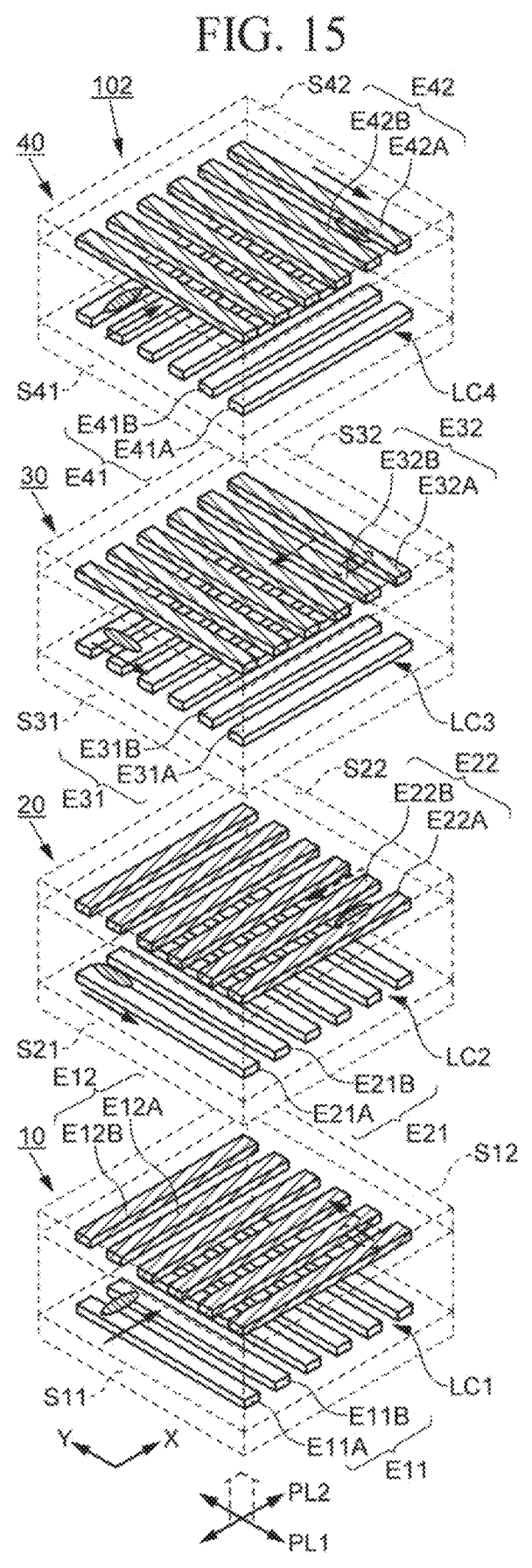

This embodiment shows a fourth configuration example of the liquid crystal light control element 102. FIG. 15 shows an arrangement of strip electrodes in each liquid crystal cell of the liquid crystal light control element 102 of this embodiment. The arrangement of the strip electrodes in the first liquid crystal cell 10, the second liquid crystal cell 20, the third liquid crystal cell 30, and the fourth liquid crystal cell 40 shown in FIG. 15 is the same as in the first embodiment, but the alignment direction of the alignment film (not shown) in the second liquid crystal cell 20 and the alignment film (not shown) in the fourth liquid crystal cell 40 are different from those of the first liquid crystal cell 10 and the third liquid crystal cell 30. That is, the alignment direction of the alignment films (not shown) of the first liquid crystal cell 10 and the third liquid crystal cell 30 is the direction that intersects the longitudinal direction of the strip electrode, whereas the alignment films of the second liquid crystal cell 20 and the fourth liquid crystal cell 40 (not shown) are aligned in the same direction as the longitudinal direction of the strip electrode. As shown schematically in FIG. 15, the long axes of the liquid crystal molecules in the liquid crystal layers of the first liquid crystal cell 10 and the third liquid crystal cell 30 are aligned in a direction that intersects the longitudinal directions of the first electrodes E11, E31 and the second electrodes E12, E32, whereas the long axis of the liquid crystal molecules of the liquid crystal layer of the second liquid crystal cell 20 and the fourth liquid crystal cell 40 is aligned in a direction parallel to the longitudinal direction of the first electrodes E21, E41 and the second electrodes E22, E42, which is different from the first embodiment.

According to the arrangement shown in FIG. 15, the alignment films (not shown) on the first substrate S11, S41 sides of the first liquid crystal cell 10 and the fourth liquid crystal cell 40 are aligned in a direction parallel to the X-axis direction, and the alignment films (not shown) on the second substrate S12, S42 sides are aligned in a direction parallel to the Y-axis direction. The longitudinal direction of the strip pattern of the first electrode E11 of the first liquid crystal cell 10 is oriented parallel to the Y-axis direction and the longitudinal direction of the strip pattern of the second electrode E12 is oriented parallel to the X-axis direction, and the longitudinal direction of the strip pattern of the first electrode E41 of the fourth liquid crystal cell 40 is oriented parallel to the X-axis direction and the longitudinal direction of the strip pattern of the second electrode E42 is oriented parallel to the Y-axis direction.

The alignment films (not shown) on the first substrate S21, S31 sides of the second liquid crystal cell 20 and the third liquid crystal cell 30 are aligned in a direction parallel to the Y-axis direction and the alignment films on the second substrate S22, S32 sides are aligned in a direction parallel to the X-axis direction. The longitudinal direction of the strip pattern of the first electrode E21 of the second liquid crystal cell 20 is oriented parallel to the Y-axis direction and the longitudinal direction of the strip pattern of the second electrode E22 is oriented parallel to the X-axis direction, and the longitudinal direction of the strip pattern of the first electrode E31 of the third liquid crystal cell 30 is oriented parallel to the X-axis direction and the longitudinal direction of the strip pattern of the second electrode E32 is oriented parallel to the Y-axis direction. In the present embodiment, the alignment direction of the alignment film is set at 90 degrees to the direction of extension of the electrode having a strip pattern, according to the definition of the X-axis and Y-axis directions, and it is also possible to set the direction at 90±10 degrees.

Table 3 shows an example of control signals applied to each liquid crystal cell in the liquid crystal light control element 102 shown in FIG. 15. The control signals A, B, and E shown in Table 3 correspond to the control signals shown in FIG. 11. In Table 3, the alignment directions are crossed or parallel, which correspond to the alignment of the liquid crystal molecules described above.

TABLE 3

| Liquid Crystal Light Control Element: 102 | | | | Control Signal |
|---|---|---|---|---|
| Fourth Liquid | Second | 2nd Electrode | 4th strip electrode: E42B | B |
| Crystal Cell 40 | Substrate | E42 | 3rd strip electrode: E42A | A |
| (Alignment | First | 1st Electrode | 2nd strip electrode: E41B | E |
| direction: | Substrate | E41 | 1st strip electrode: E41A | E |
| parallel) | | | | |
| Third Liquid | Second | 2nd Electrode | 4th strip electrode: E32B | B |
| Crystal | Substrate | E32 | 3rd strip electrode: E32A | A |
| Cell 30 | First | 1st Electrode | 2nd strip electrode: E31B | E |
| (Alignment | Substrate | E31 | 1st strip electrode: E31A | E |
| direction: | | | | |
| Crossed) | | | | |
| Second Liquid | Second | 2nd Electrode | 4th strip electrode: E22B | B |
| Crystal | Substrate | E22 | 3rd strip electrode: E22A | A |
| Cell 20 | First | 1st Electrode | 2nd strip electrode: E21B | E |
| (Alignment | Substrate | E21 | 1st strip electrode: E21A | E |
| direction: | | | | |
| parallel) | | | | |
| First Liquid | Second | 2nd Electrode | 4th strip electrode: E12B | B |
| Crystal | Substrate | E12 | 3rd strip electrode: E12A | A |
| Cell 10 | First | 1st Electrode | 2nd strip electrode: E11B | E |
| (Alignment | Substrate | E11 | 1st strip electrode: E11A | E |

TABLE 3-continued

| Liquid Crystal Light Control Element: 102 | Control Signal |
|---|---|
| direction: Crossed) | |

As shown in FIG. 15 and Table 3, the control signals are input to each liquid crystal cell of the liquid crystal light control element 102 in the same manner as in the first embodiment. When the liquid crystal light control element 102 is in operation, the control signals shown in Table 3 are input to each strip electrode of each liquid crystal cell.

The first electrode E11 of the first liquid crystal cell 10, the first electrode E21 of the second liquid crystal cell 20, the first electrode E31 of the third liquid crystal cell 30, and the first electrode E41 of the fourth liquid crystal cell 40 can be replaced by the flat plate electrode (solid electrode) shown in FIG. 12 in the first embodiment.

Fifth Embodiment

The liquid crystal light control element 102 shown in the first embodiment may have only the first electrode E11 of the first liquid crystal cell 10 as a flat plate electrode (solid electrode), as shown in FIG. 9. FIG. 16 shows a configuration in which the first electrode E11 of the liquid crystal light control element 102 shown in the first embodiment is a flat plate electrode E11. Such an electrode configuration can also operate in the same way as the liquid crystal light control element 102 shown in the first embodiment. A configuration in which the electrode on the first substrate side of any one or more of the first to fourth liquid crystal cells is the above flat plate electrode can also be adopted, and is not limited to the above configuration.

Sixth Embodiment

This form shows the light distribution shape of the first embodiment of the liquid crystal light control element and the second embodiment of the liquid crystal light control element.

Figure 17A:
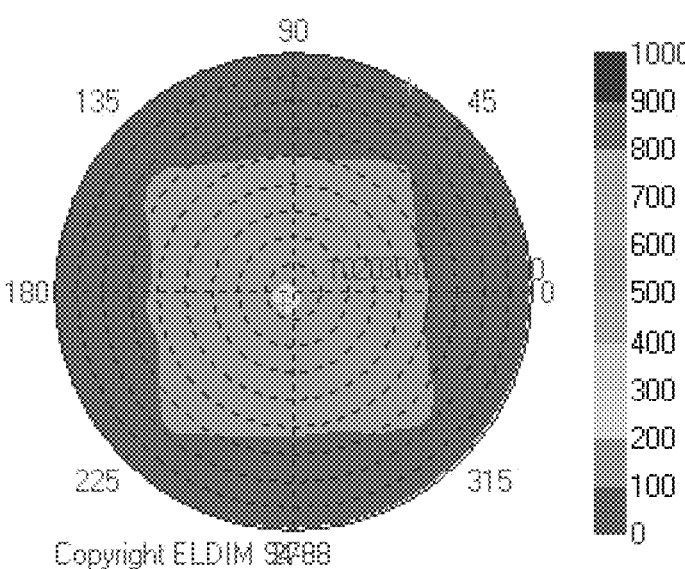
FIG. 17A is an example of the light distribution shape obtained by the liquid crystal light control element shown in the first embodiment.

FIG. 17A shows the light distribution shape obtained by the liquid crystal light control element shown in the first embodiment. As shown in FIG. 17A, according to the liquid crystal light control element shown in the first embodiment and its driving conditions, a square alignment shape can be obtained.

Figure 17B:
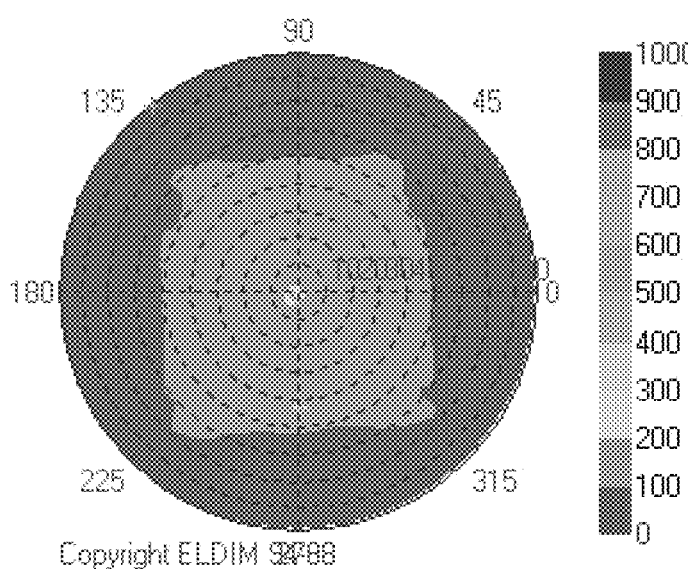
FIG. 17B is an example of the light distribution shape obtained by the liquid crystal light control element shown in the reference example 1.

FIG. 17B shows Reference Example 1. Although the Reference Example 1 has the same electrode arrangement of the liquid crystal cells as the liquid crystal light control element shown in the first embodiment, the driving conditions are different, and the results are shown in the case of driving under the condition that voltage is applied to the first electrode of each liquid crystal cell and a transverse electric field is not generated on the side of the second electrode. As shown in FIG. 17B, although an alignment shape close to a square is obtained in the Reference Example 1, the outlines are distorted when compared to the results shown in FIG. 17A.

Figure 18A:
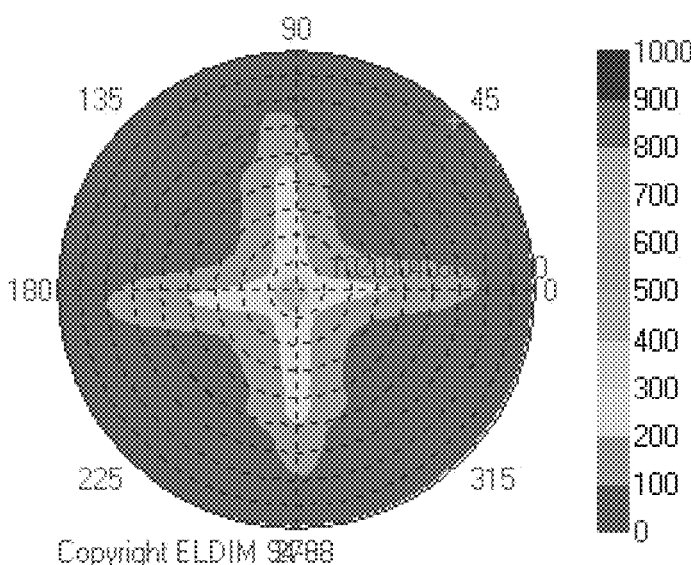
FIG. 18A is an example of the light distribution shape obtained by the liquid crystal light control element shown in the second embodiment.

FIG. 18A shows the light distribution shape obtained by the liquid crystal light control element shown in the second embodiment. As shown in FIG. 18A, according to the liquid crystal light control element shown in the second embodiment and its driving conditions, a cross-shaped alignment shape can be obtained.

Figure 18B:
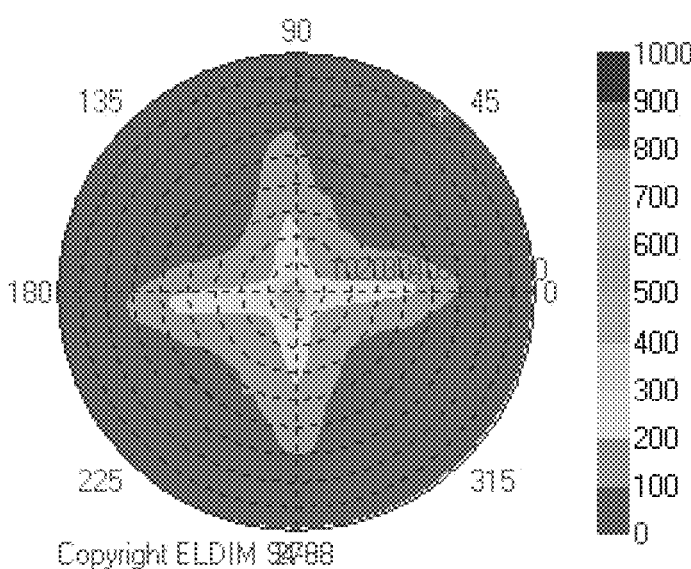
FIG. 18B is an example of the light distribution shape obtained by the liquid crystal light control element shown in the reference example 2.

FIG. 18B shows Reference Example 2. The Reference Example 2 shows a case in which the electrode arrangement of the liquid crystal cell is reversed in the driving conditions from the liquid crystal light control element shown in the second embodiment, and a transverse electric field is generated at the first electrode E11 of the first liquid crystal cell 10, the second electrode E22 of the second liquid crystal cell 20, the first electrode E31 of the third liquid crystal cell 30, and the second electrode E42 of the fourth liquid crystal cell 40. As shown in FIG. 18B, a light distribution shape similar to a cross shape is obtained in Reference Example 2, although, compared with the result in FIG. 18A, the cross shape is sharper in the second embodiment.

As is clear from the results in FIG. 17A and FIG. 17B, FIG. 18A and FIG. 18B, When a transverse electric field is generated by only one side electrode (electrode on the first substrate side or the second substrate side) in one liquid crystal cell, as shown in the first embodiment and the second embodiment, in the liquid crystal cell on the light source side, it can be seen that a sharper light distribution shape can be obtained if the light is diffused by the electrode on the opposite side of the light input side (the second electrode on the second substrate side).

That is, as shown in the present embodiment above, at least the light incident on the first liquid crystal cell 10 is not diffused before it is optically rotated, thereby preventing the light from being optically rotated while diffusing, reducing the loss of light during the optical rotation and suppressing the disruption of the shape of the light distribution pattern.

What is claimed is:

1. A liquid crystal light control device comprising:
   a first liquid crystal cell into which light, including a first polarized component having a first polarized axis in a first direction and a second polarized component having a second polarized axis in a second direction intersecting the first direction, is configured to enter;
   a second liquid crystal cell overlapping the first liquid crystal cell;
   a third liquid crystal cell overlapping the second liquid crystal cell; and
   a fourth liquid crystal cell overlapping the third liquid crystal cell,
   wherein
   each of the first liquid crystal cell and the second liquid crystal cell includes:
      a first substrate including a first alignment film having an alignment direction in the second direction;
      a second substrate including an electrode having a strip pattern extending in the second direction and a second alignment film having an alignment direction in the first direction; and
      a liquid crystal layer between the first substrate and the second substrate, a long axis direction of liquid crystal molecules in the liquid crystal layer aligned according to both of the alignment directions of the first and second alignment films so as to rotate horizontally from the second direction to the first direction from the first substrate side to the second substrate side, each of the third liquid crystal cell and the fourth liquid crystal cell includes:

a first substrate including a first alignment film having an alignment direction in the first direction;

a second substrate including an electrode having a strip pattern extending in the first direction and a second alignment film having an alignment direction in the second direction; and a liquid crystal layer between the first substrate and the second substrate, a long axis direction of liquid crystal molecules in the liquid crystal layer aligned according to both of the alignment directions of the first and second alignment films so as to rotate horizontally from the first direction to the second direction from the first substrate side to the second substrate side, and the first substrate of one or more liquid crystal cells selected from a group of the first liquid crystal cell, the second liquid crystal cell, the third liquid crystal cell, and the fourth liquid crystal cell has a flat plate electrode, and the first substrate of any remaining liquid crystal cells have a strip patterned electrode extending in a direction intersecting the extending direction of the electrode having the strip pattern of the second substrate.

2. The liquid crystal light control device according to claim 1, wherein a longitudinal direction of the strip pattern of the electrode having the strip pattern is arranged to intersect an alignment direction of the second alignment film, and a transverse electric field is generated in the same direction as the alignment direction of the second alignment film in an ON state, in an OFF state in which no potential is applied to the flat plate electrode and the strip patterned electrode of all of the liquid crystal cells, the first polarized component and the second polarized component are optically rotated as passing through each of the liquid crystal layer from the first substrate to the second substrate so as to rotate the first polarized axis from the first direction to the second direction and the second polarized axis from the second direction to the first direction, in an ON state in which a potential is applied to the electrodes of the first liquid crystal cell and the second liquid crystal cell to generate a transverse electric field in the first direction as the alignment direction of the second alignment film, and a potential is applied to the electrodes of the third liquid crystal cell and the fourth liquid crystal cell to generate a transverse electric field in the second direction as the alignment direction of the second alignment film, in the first liquid crystal cell, the first polarized component and the second polarized component are optically rotated by passing through the liquid crystal layer from the first substrate to the second substrate so as to rotate the first polarized axis from the first direction to the second direction and the second polarized axis from the second direction to the first direction with the second polarized component diffusing in the first direction at the second substrate side, in the second liquid crystal cell, the first polarized component and the second polarized component are optically rotated by passing through the liquid crystal layer from the first substrate to the second substrate so as to rotate the first polarized axis from the first direction to the second direction and the second polarized axis from the second direction to the first direction with the first polarized component diffusing in the first direction at the second substrate side, in the third liquid crystal cell, the first polarized component and the second polarized component are optically rotated by passing through the liquid crystal layer from the first substrate to the second substrate so as to rotate the first polarized axis from the first direction to the second direction and the second polarized axis from the second direction to the first direction with the first polarized component diffusing in the second direction at the second substrate side, and in the fourth liquid crystal cell, the first polarized component and the second polarized component are optically rotated by passing through the liquid crystal layer from the first substrate to the second substrate so as to rotate the first polarized axis from the first direction to the second direction and the second polarized axis from the second direction to the first direction with the second polarized component diffusing in the second direction at the second substrate side.

3. The liquid crystal light control device according to claim 1, wherein the electrode having the strip pattern includes at least one first strip electrode having the strip pattern and at least one second strip electrode having the strip pattern, wherein the at least one first strip electrode and the at least one second strip electrode are arranged alternately at a distance.

4. The liquid crystal light control device according to claim 1, wherein the flat plate electrode is provided on the first substrate of the first liquid crystal cell.

5. The liquid crystal light control device according to claim 1, wherein the strip patterned electrode of the first substrate of each of the remaining liquid crystal cells has at least one third strip electrode and at least one fourth strip electrode having the strip pattern, wherein the at least one third strip electrode and the at least one fourth strip electrode are arranged alternately at a distance.

6. The liquid crystal light control device according to claim 1, wherein an angle of intersection of the first direction and the second direction is 90±10 degrees.

7. The liquid crystal light control device according to claim 1, wherein the liquid crystal layer is a twisted nematic liquid crystal.

8. The liquid crystal light control device according to claim 1, wherein three of the remaining liquid crystal cells have the strip patterned electrode.

9. The liquid crystal light control device according to claim 1, wherein at least two of the remaining liquid crystal cells have the strip patterned electrode.

10. The liquid crystal light control device according to claim 1, wherein at least one of the remaining liquid crystal cells have the strip patterned electrode.

* * * * *